US012743849B2

(12) United States Patent
Qiu et al.

(10) Patent No.: US 12,743,849 B2
(45) Date of Patent: Sep. 22, 2026

(54) METASURFACE DESIGN AND PLACEMENT

(71) Applicant: Microsoft Technology Licensing, LLC, Redmond, WA (US)

(72) Inventors: Lili Qiu, Shanghai (CN); Hao Pan, Shanghai (CN); Ruichun Ma, Gaoyou (CN); Shicheng Zheng, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 18/757,113

(22) Filed: Jun. 27, 2024

(65) Prior Publication Data

US 2025/0005856 A1 Jan. 2, 2025

Related U.S. Application Data

(60) Provisional application No. 63/510,730, filed on Jun. 28, 2023.

(51) Int. Cl.
*H01Q 15/00* (2006.01)
*G06T 17/00* (2006.01)

(52) U.S. Cl.
CPC .................................... *G06T 17/00* (2013.01)

(58) Field of Classification Search
CPC ..................... G06T 17/00; G06T 19/00; G06T 2207/10024; G06N 3/042; G06N 3/045; G06N 3/08; G06N 3/082; G06N 5/00; G06V 10/75; G06F 17/00; G06F 16/41; H01Q 15/0046; H04B 7/04013
See application file for complete search history.

(56) References Cited

U.S. PATENT DOCUMENTS 12,132,253 B2 * 10/2024 Green .................. H01Q 3/2647
12,259,855 B1 * 3/2025 Niegemann ............. G06F 16/41

OTHER PUBLICATIONS

Dinh-Thuy, Creating and Operating Areas With Reduced Electromagnetic Field Exposure Thanks to Reconfigurable Intelligent Surfaces, Orange Innovations (Year: 2020).*
International Search Report and Written Opinion received for PCT Application No. PCT/US2024/035890, Dec. 3, 2024, 21 pages.
Invitation to Pay Additional Fees received for PCT Application No. PCT/US2024/035890, mailed on Oct. 10, 2024, 11 pages.

(Continued)

*Primary Examiner* — Wesner Sajous
(74) *Attorney, Agent, or Firm* — Holzer Patel Drennan

(57) ABSTRACT

A method of designing a passive metasurface system within an environment includes receiving a three-dimensional model of the environment including one or more transmitter locations and one or more target locations, and determining one or more metasurface designs and placements to achieve a given objective. The method may also include computing a received signal strength at the one or more target locations based on the three-dimensional model of the environment, computing the received signal strength at the one or more target locations based on the three-dimensional model of the environment and the one or more metasurface designs and placements, and/or calculating ray traces and/or using machine learning to determine the received signal strength at the one or more target locations on the three-dimensional model of the environment and the one or more metasurface designs and placements.

22 Claims, 23 Drawing Sheets

(56) References Cited

OTHER PUBLICATIONS

Phan-Huy, et al., "Creating and Operating Areas With Reduced Electromagnetic Field Exposure Thanks to Reconfigurable Intelligent Surfaces", Arxiv.org, Cornell University Library, Jun. 14, 2022, 5 pages.

International Preliminary Report on Patentability (Chapter I) received for PCT Application No. PCT/US2024/035890, mailed on Jan. 8, 2026, 15 pages.

Ma, et al., "AUTOMS: Automated Service for mmWave Coverage Optimization using Low-cost Metasurfaces", In Proceedings of the 30th Annual International Conference on Mobile Computing and Networking, May 29, 2024, pp. 62-76.

* cited by examiner

700

Step1: Print patterns on A4 paper with a laser printer

Step2: Stamp aluminum foil on the A4 paper with a laminator

Step3: Tear the aluminum foil on the A4 paper to get the metal-plated patterns

Step4: Paste the A4 papers on the aluminum board ii) Coverage performance and gain from metasurface i) 3D model, layout, and optimal metasurface design ii) Coverage performance and gain from metasurface Codeword #1

Codeword #2 i). 3D model, layout, and optimal metasurface design

Receive a three-dimensional model of the environment including a location of an access point and a location of a target point
1702

Simulate rays that propagate from the access point to locations within the environment
1704

Compute a received signal strength at the location of the target point for each simulated ray arriving at the target point
1706

METASURFACE DESIGN AND PLACEMENT

CROSS-REFERENCE TO RELATED APPLICATIONS

The present application claims benefit of priority to U.S. Provisional Application No. 63/510,730, entitled "Metasurface Reflector Design and Placement for Enhanced mmWave Signal Transmissions" and filed on Jun. 28, 2023, which is specifically incorporated by reference for all that it discloses and teaches.

BACKGROUND

Millimeter wavelength ("mmWave") networks (e.g., 802.11ad/ay Wi-Fi networks, "Fifth Generation" or "5G" wireless telephony and data networks) offer wide bandwidth operation for high-speed wireless communications. However, communications at the mm Wave frequencies suffer from limited range and high susceptibility to blockage. Existing coverage enhancement solutions not only incur a significant cost but also require expert knowledge for system design and deployment.

SUMMARY

In some aspects, the techniques described herein relate to a method of designing a passive metasurface system within an environment, the method including: receiving a three-dimensional model of the environment including one or more transmitter locations and one or more target locations; and determining one or more metasurface designs and placements to achieve a given objective.

In some aspects, the techniques described herein relate to a method of designing a passive metasurface system within an environment, the method including: receiving a three-dimensional model of the environment including a location of an access point and a location of a target point; calculating rays that propagate from the access point to locations within the environment, wherein at least some of the rays are simulated to propagate through one or more passive metasurfaces within the environment and to yield attenuation and phase of each ray propagating through the one or more passive metasurfaces; computing a received signal strength at the location of the target point for each ray arriving at the target point based on the attenuation and phase of each ray propagating through the one or more passive metasurfaces; and determining design configurations of the one or more passive metasurfaces within the environment based on the received signal strength computed at the location of the target point for each ray.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
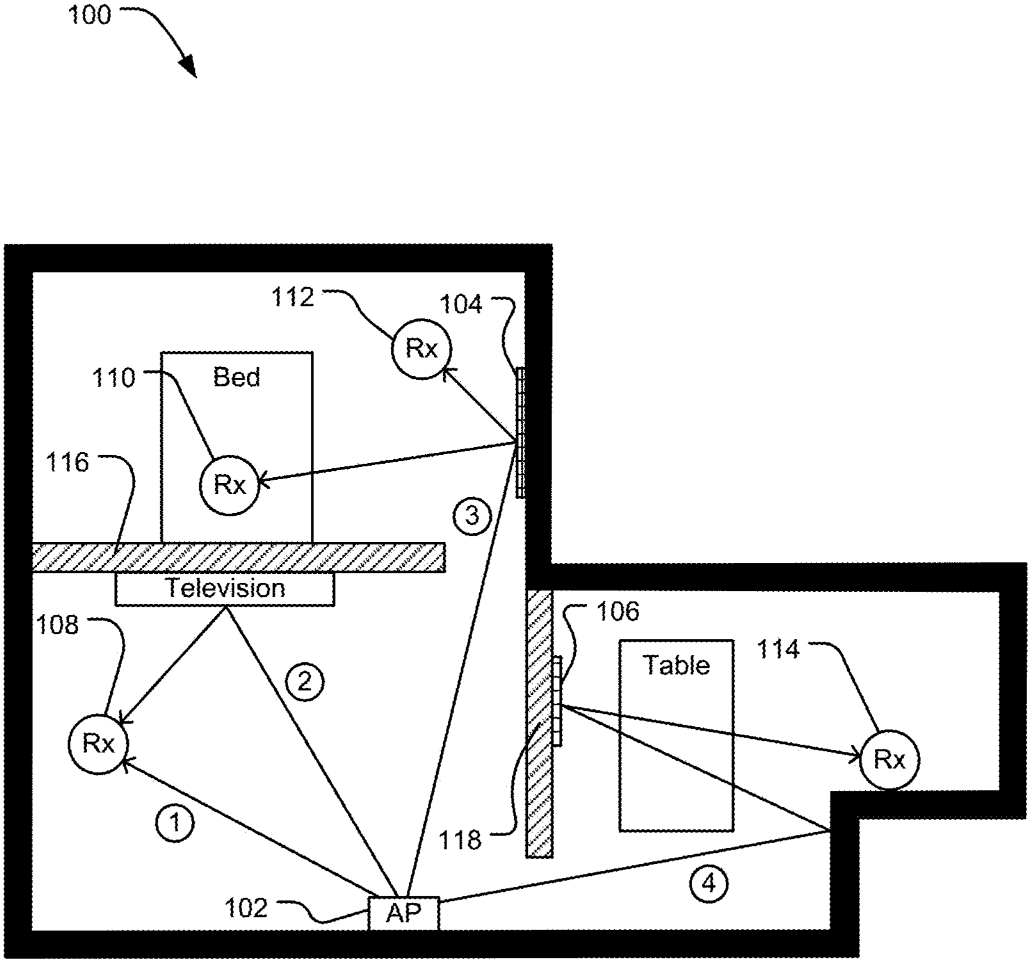
FIG. 1 illustrates an example interior environment containing an AP device, various reflective and blocking surfaces, and four reception locations.

The millimeter wave ("mmWave") frequency band (i.e., the radio frequency spectrum between 24 GHz and 100 GHz) is a foundation of high-speed wireless communications for 5G wireless telecommunications and data transfer due to its substantial bandwidth. However, the mmWave signals suffer from limited range and blockage (e.g., from some walls, appliances, and other radiofrequency obstructions) due to their short wavelength and particular propagation characteristics.

Passive metallic reflectors can extend mmWave coverage for data center, indoor, and outdoor scenarios. Passive metallic reflectors can act like mirrors, bouncing mmWave signals around obstacles along non-line of sight (NLoS) paths, but the reflection angle is static and depends on the reflector's position and orientation relative to signal transmitters and signal receivers following the law of reflection. Moreover, such reflectors primarily rely on a favorable placement of transmitters, receivers, and reflectors in order to maintain effective signal strength.

In order to automate the design and placement of passive metasurfaces in an environment, several problems can be addressed:

1) how to determine the radio frequency heatmap given a certain deployment (e.g., without a passive metasurface or with one or more passive metasurfaces with specific designs and placements),
2) how to tune or optimize the design and placement of the passive metasurfaces and transmission signals, and
3) how to design low-cost passive metasurfaces.

To address the first item above, the first ray tracing simulator that supports a general metasurface is developed for the described technology. The ray tracing simulator achieves high speed simulation (e.g., tracing billions of rays within 3 minutes). To address the second item above, the described technology provides a novel optimization framework for joint optimization of metasurface phase configurations and placement as well as access point beamforming codebooks. To address the third item above, the described technology provides a metasurface design amenable to ultra-low-cost hot stamping fabrication, featuring high reflectivity, near 2π phase control, and wideband support. It is shown for the first time that one can use paper printing to produce metasurfaces that can enhance signal strength.

The technology described herein provides a metasurface system involving metasurface phase map design and placement within an environment. In one implementation, the phase map and placement of the passive reflective metasurfaces are tuned or optimized with a gradient descent algorithm and/or a heuristic algorithm, although other tuning algorithms may be employed. The optimization consists of two stages. The first stage focuses on determining the optimal phase map of each metasurface. The wireless channels between access point (AP) antennas (e.g., acting as signal transmitters), metasurface elements, and reception locations (e.g., containing a mobile phone or other signal transceivers are accurately modeled, and the gradient descent algorithm is utilized to tune or optimize the loss function value. The wireless channels are calculated based on a set of hyper configuration parameters (i.e., high-level parameters that influence the channel modeling), namely the number of metasurfaces, their array sizes, and locations. The second stage tunes or optimizes the hyper configuration parameters using a heuristic algorithm (e.g., simulated annealing or a genetic algorithm) to achieve the best coverage performance in a designated indoor environment.

In some implementations, a signal may propagate through a passive metasurface (referred to as "transmissive" rather than "reflective"). Accordingly, the term propagation is used to encompass (1) reflection by a passive metasurface and (2) transmission through a passive metasurface. For example, a propagation coefficient may refer to either a reflection coefficient of a passive metasurface or a transmission coefficient of the passive metasurface.

In some implementations, an EM wave propagation simulator based on three-dimensional (3D) ray tracing techniques is used for metasurface support and accurate wireless channel estimation. To achieve a fast estimation of billions of paths between the AP devices, metasurface elements, and reception locations, a series of software and hardware acceleration techniques are invoked as further described herein. This propagation analysis is supported by a 3D layout model of the environment and material definitions (e.g., for wall construction (drywall, concrete), furniture (upholstered, wood, metal), and/or other objects in the environment as system inputs. In some implementations, material definitions may include material types detected on an exterior surface of an object using computer vision. The material types can be used to initialize a propagation coefficient for each object in the environment prior to tuning. The user can obtain this 3D layout model by using a mobile device application (e.g., RoomPlan API for iPhone) that captures depth information. The system can be configured to calculate metasurface deployment locations based on the fixed location of the mmWave AP device or to output a joint optimization of the AP device location and the metasurface deployment locations in the environment for better coverage. After the user inputs the 3D layout model, the system generates the tuned or optimized placements and designs for metasurfaces that the user can manufacture at low cost (e.g., using hot-stamping metallic patterns onto low-cost substrates, such as paper).

FIG. 1 illustrates an example interior environment 100 containing an AP device 102, various reflective and blocking surfaces, and four reception locations. For metasurface-aided mmWave coverage, the user can receive the mm Wave signals arriving at target points via at least two possible types of links: (1) served directly from an AP device or (2) reflected by a metasurface or other reflector. There are often other strong reflectors in an environment, for example, as shown in the interior environment 100 of FIG. 1, which can also serve as passive relays for the mm Wave signal originating from the AP device. Example reflectors can include, without limitation, television screens, reinforced concrete walls (e.g., the walls filled with dark gray shading), and metal decorative strips. There are also some objects within the interior environment 100 that can cause strong blockage (e.g., by absorption) of mmWave signals, such as interior walls (e.g., the walls filled with diagonal hashing in FIG. 1). Example objects may include various types of propagation (e.g., reflective or transmissive) surfaces including without limitation, passive metasurfaces, non-metasurface reflectors, and non-metasurface transmissive surfaces.

In the example scenario of FIG. 1, the user device at a lower left reception location 108 (marked by "Rx") can be served by signal transmissions from the AP device 102 by a direct line of sight (LoS) link (Path 1) and/or by a reflected LoS link from a strong reflector (Path 2), such as the television. The paths are indicated by the numbers in the small circles in FIG. 1. However, an upper left reception location 110 (an example target point), an upper left reception location 112 (another example target point), and a lower right reception location 114 (another example target point) are not positioned to receive a direct or reflected LoS link from the AP device 102 because an interior wall 116 blocks a LOS link between the AP device 102 and the reception locations in the upper left room, and an interior wall 118 blocks a LOS link between the AP device 102 and the reception location in the lower right room. Accordingly, a passive metasurface 104 and a passive metasurface 106 can be placed in positions to serve these obstructed reception locations.

For example, a LoS link (Path 3) transmits from the AP device 102 to the passive metasurface 104 to serve multiple reception locations, such as the upper left reception location 110 and the upper left reception location 112 in the upper left room. Based on dynamic manipulation of properties (e.g., phase) of the signal transmitted from AP device 102 along a new reflected LoS Path 3, the passive metasurface 104 can serve both reception locations concurrently in the room, in contrast to a simple reflector, such as a television, which provides a single, static reflection angle. Furthermore, similar manipulation can allow the signals along Path 3 to dynamically track with moving reception locations (e.g., a user moves around the room) through similar signal property manipulation at the AP device 102 to dynamically steer the signal toward the reception locations. In another example, a new reflected LoS link (Path 4) can be provided by placing the passive metasurface 106 at a location that receives the signal transmitted from the AP device 102 after it reflects off a strong indoor reflector (a reinforced concrete wall). The passive metasurface 106 then steers the signal to the lower right reception location 114 in the lower right room in a similar manner as the passive metasurface 104. Determination of the design and location of the metasurfaces and signal manipulation by the AP device 102 is further described below.

Figure 2:
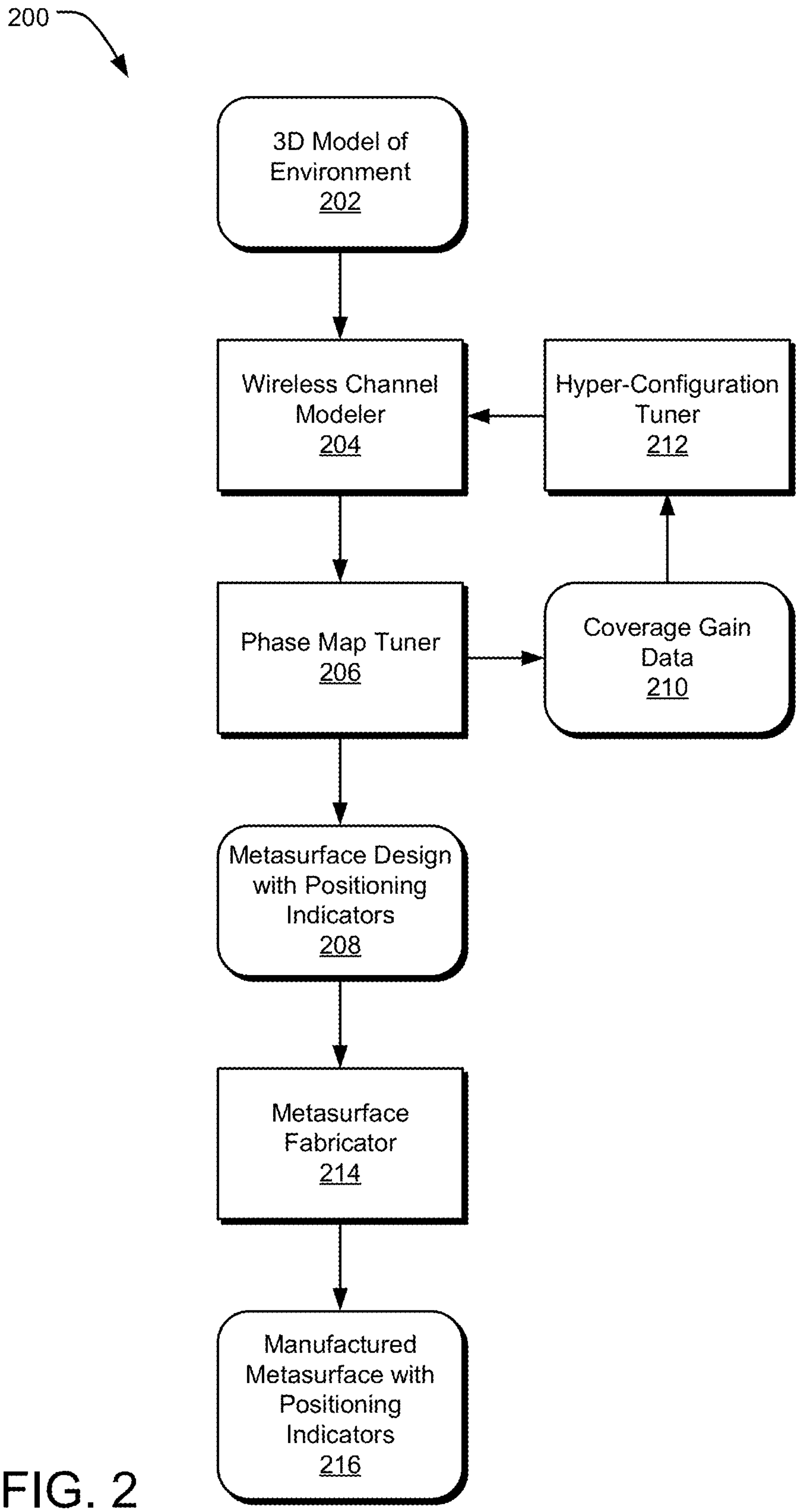
FIG. 2 illustrates an example workflow for providing a dynamically adjustable metasurface system involving intelligent metasurface phase map design and placement within a target environment.

FIG. 2 illustrates an example workflow 200 for providing a dynamically adjustable metasurface system involving intelligent metasurface phase map design and placement within a target environment. In one implementation, the workflow 200 is directed to implementation of a signal enhancement system involving passive metasurfaces for use with mmWave transmitters (e.g., AP devices). A 3D model 202 of the target environment is designed and input to the workflow 200. A wireless channel modeler 204 uses a ray tracing-based simulator to simulate one or more passive metasurfaces, a range of AP device settings (e.g., codewords), and various wireless channels within the target environment represented by the 3D model 202.

Based on these simulated factors, a phase map tuner 206 determines a phase map for one or more passive metasurfaces "placed" (through simulation) within the target environment for each of the modeled channels, outputting coverage gain data 210 for the target environment. A hyper-configuration tuner 212 receives the coverage gain data 210 and provides performance metrics as feedback through a hyper tuner to update configurations and deployment locations of metasurfaces in the target environment. Example performance metrics can include the following: signal strength, propagation diffusion (i.e., the extent to which the signal propagates through all areas of the environment, including dead spots), data rate, data loss rate, or signal delay. The updated configurations and deployment locations of the metasurfaces in the target environment are iterated through the wireless channel modeler 204 and the phase map tuner 206 to achieve a metasurface design 208 (with metasurface positioning indicators) for a passive metasurface that is designed and placed to provide tuned or optimized performance within the target environment.

The metasurface design 208 is input to a metasurface fabricator 214. Multiple metasurfaces may be manufactured in a similar way. One or more manufactured metasurfaces 216 are deployed at the indicated positions within the target environment.

Considering the symmetry of the upstream and downstream links in mm Wave communication, a down-link scenario (e.g., transmissions from the AP device as transmitter to a user device as receiver) in an indoor environment is used as the basis for the simulation. However, the described design may be worked in both directions. A typical mmWave AP device equipped with a phased array antenna (e.g., 6×6) that can perform beam steering is considered for purposes of the simulation. Additionally, the simulation limits the deployment of reflective passive metasurfaces to positions on the walls, although alternative placements may be simulated as well. Dynamic beamforming (e.g., manipulation of signal properties) at the AP device is used to adapt to the channel conditions and ensure reliable communication at different locations in the environment. Following the IEEE 802.11.ad standard, a beam scanning procedure is employed, where the AP device transmits using all possible codewords and the receiver selects and feeds back the codeword that achieves the highest SNR, which is considered the tuned or optimized link.

As indicated in the summary above, the example methodology takes a 3D model of the environment for signal enhancement as an input and performs the following processes. First, the wireless channels of the environment are constructed based on an initial metasurface deployment configuration (e.g., the number, sizes and locations of metasurfaces) as well as the AP device placement and configuration. The signal paths from the AP device antennas to the metasurface elements and then to the potential receiver (RX) locations are identified. Second, the phase map tuner implements a gradient descent algorithm to refine a tuned phase map for each metasurface that collectively tunes or maximizes the coverage under the current metasurface deployment configuration. Third, the phase map tuner returns a performance score (e.g., coverage gain data) as feedback to the hyper-configuration tuner, which updates the surface deployment configuration of the metasurface(s) and/or AP devices and repeats the optimization. The hyper-configuration tuner can run any appropriate algorithm, such as gradient descent, simulated, annealing, reinforcement learning, evolution, etc., to update inputs. When the performance converges, the optimal phase map is obtained, the design of the metasurface(s) is determined for fabrication, and the deployment location(s) of the metasurface(s) is set for installation.

In one example implementation, the hype-configurations for surface deployment can include the number of metasurfaces M, the sizes of the metasurfaces $N_{ms}$ (e.g., as specified by the number of surface elements or unit cells), and deployment locations L. For a given number of surface elements, the width and height of a metasurface are also configured. For each location La in a set of locations L, let $[x_i, y_i, z_i]$ denote the coordinates of the metasurface center in the environment. Depending on the specific deployment scenario, the disclosed methodology can tune some of the deployment configurations while the remaining configurations are set manually according to user specifications. For example, in some usage scenarios, the position of the AP device may be fixed (e.g., due to cable or power access locations), so the methodology tunes only the remaining parameters. The configuration parameters for each metasurface can include the following, without limitation: a location, a configuration (i.e., denoted as $$W_{ms}^{k},$$

where k is the index of the metasurface), and a set of beamforming codewords used by one or multiple AP devices (i.e., denoted as $$W_{ap}^{j},$$

where j is the codeword index used by the AP device). There are many algorithms that can be used to tune the configuration parameter. In one example implementation, simulated annealing, Bayesian optimization, and/or genetic algorithms can be used as search techniques to tune the components of the system can be used, although other techniques may be employed. Based on the performance metric from channel modeling and the phase map optimizer, the hyper-configuration tuner tunes the configurations iteratively until the performance converges to an acceptable result (e.g., little or no improvement during several iterations). A threshold amount of improvement may be set to define an acceptable result. Then, the optimized configurations are used for metasurface fabrication and deployment.

A goal of a phase map tuner or optimizer is to determine the phase configurations of reflective metasurface(s) and phase shift values of the phased array on the mm Wave AP device (e.g., the AP codebook) that maximize the coverage for a target environment based on deployment configurations (i.e., the number of metasurfaces along with their sizes and locations). There are many possible metrics that can quantify the coverage of an area. The described approach is agnostic to the physical layer specifications of the AP device (e.g., modulation schemes or endpoint hardware implementations), such that the design methodology can be applied to different mmWave devices and protocols. The tuning or optimization objective is to tune or optimize the sum of channel capacity between a transmitter location and all possible receiver locations. The channel matrices between the transmitter location, receiver locations, and metasurface location(s) can be calculated using ray tracing. The tuning or optimization problem is differentiable, and a gradient descent algorithm with an Adam optimizer can be used to maximize the sum capacity. The tuning or optimization problem can be understood as maximizing the distribution of signal power from the metasurfaces to all receiver locations. The log function in Shannon capacity favors improving the SNR of the receiver positions with lower SNR since the same amount of SNR increase leads to a larger capacity increase as they have a larger gradient, thereby improving communication performance in what were previously dead spots.

The jth codeword among all $N_c$ code words is defined as $$W_{ap}^{(j)}$$

$\in \mathbb{C}^{1\times N_t}$ and the phase configuration of kth surface among all M surfaces as $$W_{ms}^{(k)}$$

$\in \mathbb{C}^{N_{ms}\times 1}$, where $N_{ms}$ and $N_t$ are the number of metasurface elements and transmitting antennas, respectively. Each element of the phase configuration and codebook matrix corresponds to a phase shift, denoted as $e^{j\theta}$, where θ is the phase to be determined. The sum of channel capacity between the transmitter and receiver location is used as the tuning objective and derived as follows:

$$\max_{W_{ms},W_{ap}} \sum_{i=1}^{N_r} \log_2\left(1 + \frac{S_i(W_{ms}, W_{ap})}{\text{Noise}}\right) \quad (1)$$

where $N_r$ denotes the number of receiver locations and $S_i$ denotes the received signal at the ith receiving antenna as a function of metasurface phase maps and the AP device codebook. A noise floor of −70 dBm is set to match the experiment hardware (i.e., zero capacity if the SNR is below −70 dBm).

The calculation for received signal strength $S_i$ can be described as follows. Let $P_t$ denote the transmission power, $G_t$ denote the transmission antenna gain, and $G_r$ denote the receiver antenna gain. The transmitting antenna is assumed to be directional, and the receiving antenna is assumed to be omnidirectional in the simulation to match a testbed configuration. Since the AP device can switch between multiple codewords, the maximum strength among all codewords is the value of $S_i$:

$$S_i = \sqrt{P_t G_t G_r} \max_{j\in[1,N_C]} W_{ap}^{(j)}(H_{ms} + H_{T-R}) \quad (2)$$

where $H_{ms} \in \mathbb{C}^{N_t\times 1}$ is the channel consisting of propagation paths affected by metasurfaces and $H_{T-R} \in \mathbb{C}^{N_t\times 1}$ is the channel matrix consisting of propagation paths between the transmitter and receiver locations not intersecting with any metasurface. The metasurface channel, $H_{ms}$ is a function of $$\{W_{ms}^{(k)}\}_{k=1}^{M}.$$

If only the first-order reflections from metasurfaces are considered, then $$H_{ms} = \sum_{k=1}^{M} \left(H_{T-ms} W_{ms}^{(k)} H_{ms-R}\right) \quad (3)$$

where $H_{T-ms} \in \mathbb{C}^{N_t\times N_{ms}}$ is the channel matrix between transmitting antennas and metasurface elements, and $H_{ms-R} \in \mathbb{C}^{N_{ms}\times 1}$ is the channel matrix between metasurface elements and the receiver. Equation 3 can be further extended to support reflections between multiple metasurfaces. Thus, three channel matrices for the objective function (e.g., $H_{T-R}$, $H_{T-ms}$, and $H_{ms-R}$) are employed. These channel matrices can be calculated using ray tracing in the 3D environment model.

To solve the tuning or optimization problem discussed above, the channels between locations of the mmWave AP device(s), the metasurface(s), and the receiver(s) in the environment need to be accurately modeled and/or simulated. Specifically, transmitter-to-receiver, transmitter-to-metasurface(s), and metasurface(s)-to-receiver channel matrices are calculated. Metasurface(s)-to-metasurface(s) channels also need to be calculated if multiple metasurfaces are deployed. Each meta-surface element is modeled as a reflective antenna with a phase shift. Thus, despite different channels, the metasurfaces are modeled in the same way (e.g., as channels between $N_s$ source antennas and $N_d$ destination antennas). Note that, given the high attenuation of mmWave signals, reflection and direct LoS paths are primarily considered. Therefore, all the LoS propagation paths (reflection and direct) are identified, and then the channels are calculated.

In some implementations, ray tracing-based modeling is used to accurately and efficiently simulate wireless signal propagation. A metasurface can consist of many sub-wavelength elements forming the unit cells, which introduces a large number of propagation paths. Traditional ray tracing faces significant scalability issues. A fast ray tracing software is thus disclosed herein to support channel path simulation from general metasurface reflections. At a high level, rays generated from the source are traced, and their propagation paths are modeled in terms of direction, signal attenuation, and signal phase.

In some implementations, channels are calculated in two steps. First, a ray-launching method is used to find the propagation paths and the reflectors they intersect with. A large number of rays is randomly emitted from the sources. Some of the rays will reach the destinations of receiver locations and the propagation paths associated with these rays are recorded. Other rays either miss the destinations or are dropped because of their low signal strengths. Next, the validity of the recorded propagation paths is verified, and the channel response of each verified path is calculated with the image method. Then, the channel responses, which contain both amplitude and phase information, of all paths are summed, and the destinations of the channels are determined. In one example, to verify the accuracy of the channel modeling, real-world measurements in a conference room scenario were collected and compared to the simulated results.

Several techniques can be used to enhance simulation efficiency. First, the propagation paths among nearby receiver destinations can be shared. Finding propagation paths is the most expensive step in ray tracing. The chance of missing paths can be minimized with a large number of rays and simulation accuracy can be improved, but this leads to high memory and computation cost. To reduce the cost, the area of interest can be partitioned into grids that each contain several nearby destinations, and each grid can share found propagation paths with nearby grids. This way, propagation paths can be found with a smaller number of rays. Paths with magnitudes below −100 dBm can also be discarded to further reduce the computation overhead as they are unlikely to provide adequate signal strength. Second, the propagation path information can be stored using coordination transformation matrixes from source to destination with respect to reflectors instead of exact path trajectories. This saves memory and computation time for channel calculation. Third, OptiX, a raytracing engine, can be used for ray tracing implementation to leverage ray tracing cores (i.e., a type of application-specific integrated circuit) for hardware acceleration. Other simulation engines may also be employed. For example, an accurate estimation of 1.6 billion wireless channels was determined within three minutes on an NVIDIA A100 graphics processing unit (GPU). In other implementations, alternative models may be employed.

Figure 3A:
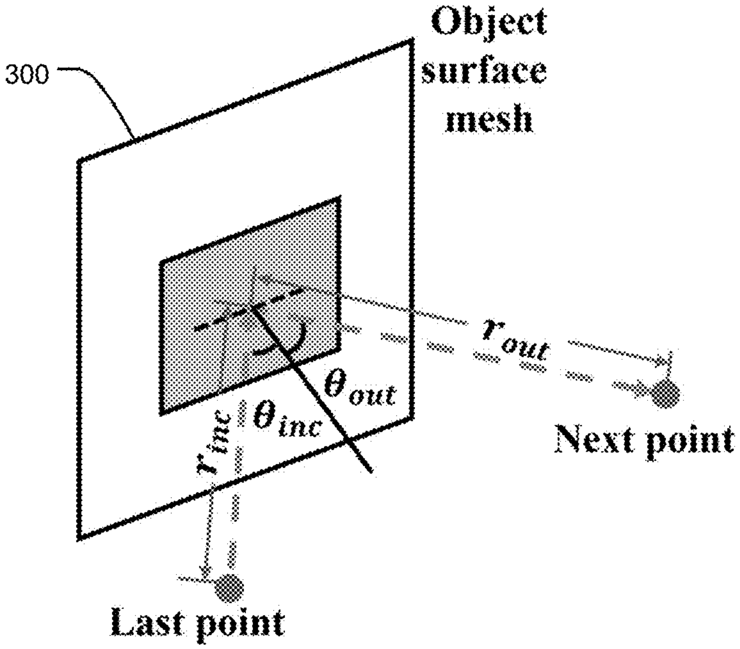
FIG. 3A illustrates a reflection occurring when the size of a passive metasurface is sufficiently large (e.g., the area of a wall or floor).
Figure 3B:
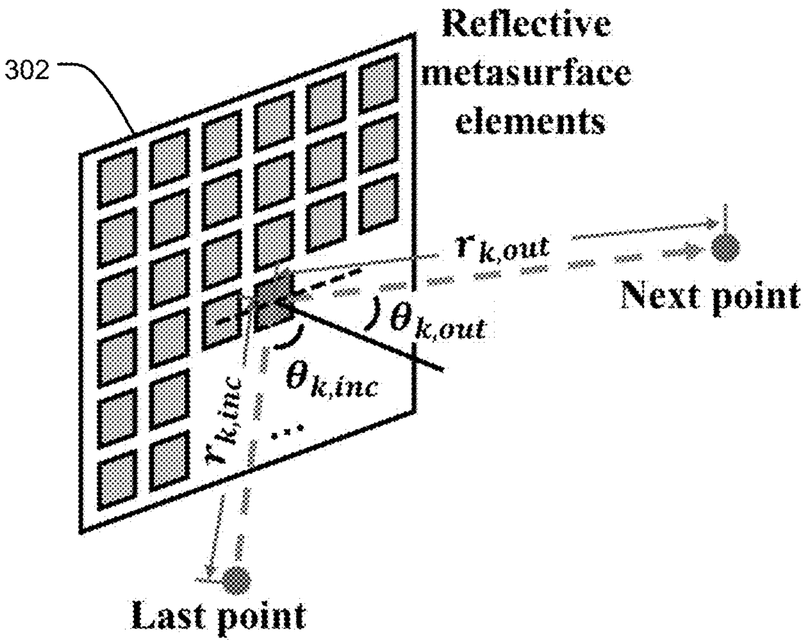
FIG. 3B illustrates a reflection occurring when the size of a passive metasurface 302 is small (e.g., the size of metasurface elements).

FIGS. 3A and 3B illustrate parameters used in an example efficient channel modeling implementation. Given the propagation paths between a source and a receiver, the possible propagation paths are summed to calculate the channel response. A LOS channel can be derived as $$h_{LoS} = \frac{\lambda}{4\pi r} e^{\frac{2\pi r}{\lambda}},$$

where λ is the wavelength of carrier frequency, and r is the distance between the AP device and the receiver location. For NLOS paths that include reflections from objects or metasurface elements, reflections can happen multiple times until reaching the destination. To simplify the calculation, each reflection can be analyzed separately and then multiplied together. When a path goes from a prior point to the next point, at least two kinds of reflections can happen, as shown in FIGS. 3A and 3B. FIG. 3A illustrates a reflection occurring when the size of a passive metasurface 300 is sufficiently large (e.g., the area of a wall or floor). In this condition, the prior point is within the near-field distance of the passive metasurface 300, $\theta_{inc}=\theta_{out}$, and the channel of this reflection is represented by:

$$h_{re} = \tau \frac{\lambda}{4\pi(r_{inc} + r_{out})} e^{\frac{2\pi}{\lambda}(r_{inc}+r_{out})} \tag{4}$$

FIG. 3B illustrates a reflection occurring when the size of a passive metasurface 302 is small (e.g., the size of metasurface elements). In this conditioning, propagation is in the far field, as represented by:

$$h_{re} = \tau \frac{\lambda}{4\pi r_{inc}} e^{\frac{2\pi}{\lambda} r_{inc}} \frac{\lambda}{4\pi r_{out}} e^{\frac{2\pi}{\lambda} r_{out}} \tag{5}$$

where τ denotes the reflection coefficient of the passive metasurface 302 or a passive metasurface element. Next, the LoS channel and NLOS channels are added to calculate the channel of one source-destination pair:

$$h_{s-t} = \sum_{i=1}^{P} \prod_{j=1}^{\gamma_i} h_{re}^{(j)} + h_{LoS} \tag{6}$$

where P is the number of NLOS propagation paths between the source and destination, $\gamma_i$ is the number of reflections of the ith propagation path. By replacing the source and destination with the transmitter, receivers, or metasurfaces, all the channels needed for the objective function (e.g., $H_{T-R}$, $H_{T-ms}$, and $H_{ms-R}$) are present. These values can then be used in Equation 3 to complete the optimization framework.

Three example design goals for the metasurface may include, without limitation: (i) low fabrication cost, meaning that the material cost is significantly lower than that of other mmWave coverage solutions or a new mmWave AP device; (ii) low complexity, which reduces the fabrication cost, increases the robustness, and simplifies the deployment of metasurfaces; and (iii) near-2π phase control, which is an appropriate measure for good metasurface performance and is intended to be maintained over wide 60 GHz channels. A passive metasurface design that achieves near-2π reflection phase control with low complexity and low cost may be fabricated using common materials (e.g., printer papers, polyvinyl chloride (PVC) plastic sheets, and hot stamping foils) and standard office equipment, such as a laser printer and a laminator, to fabricate the metasurface prototypes. A cost of less than $3 for a passive metasurface 160×200 elements is achievable, which is orders of magnitude less expensive than the existing metasurfaces (e.g., \$300 for MilliMirror and \$10,000 for mmWall).

A passive metasurface design (e.g., using metallic patterns only without active or programmable circuit components) can be leveraged to simplify fabrication and deployment. Active components would raise the system complexity and cost substantially and consume significant power, which would reduce the benefits of metasurfaces over installing one or more additional AP devices within the environment. Programmable components on metasurfaces would lead to a separate metasurface control plane, which often requires feedback from communication endpoints. Both would complicate the design and deployment. Furthermore, since the performance of metasurfaces depends on their size due to the law of physics, a metasurface with tens of thousands or more elements would be beneficial for many applications, but each inexpensive programmable component on each element or unit cell would add up to thousands of programmable components for a small piece of surface, resulting in a huge material cost.

Figure 4A:
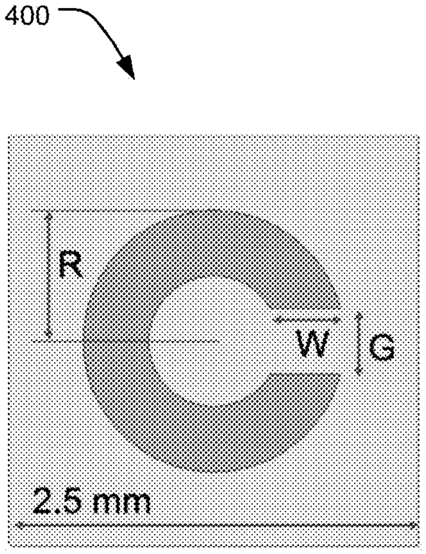
FIGS. 4A and 4B illustrate an example split ring-based pattern, which is the template of different patterns for phase control.
Figure 4B:
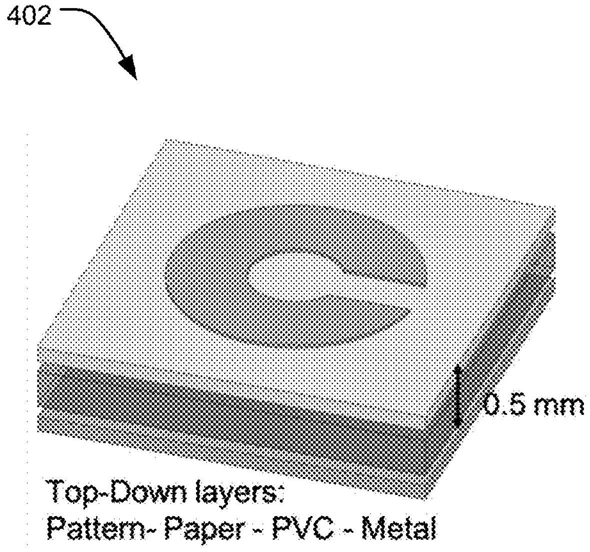
Figure 4C:
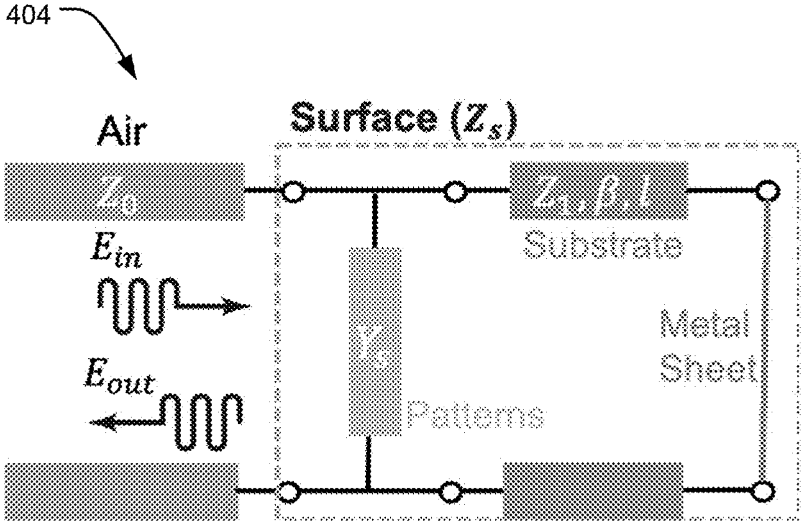
FIG. 4C illustrates an example equivalent circuit model.

FIGS. 4A and 4B illustrate an example split ring-based pattern, which is the template of different patterns for phase control, and FIG. 4C illustrates an example equivalent circuit model. FIG. 4A depicts a plan view of a split ring-based pattern 400. Achieving near-2π phase control (e.g., approximately 2π phase shifts) for mmWave can be achieved with a simple surface design of 2D metallic patterns on a thin (e.g., ~0.5 mm) multi-layer substrate to induce phase shifts. By varying the pattern dimensions, including ring radius (R), width (W), and gap (G), between different unit cells of the metasurface, the phase shift induced by the pattern can be changed. However, a single pattern layer has a limited phase shift capability. One solution is to cascade more layers of patterns, but this increases the design complexity significantly. Therefore, a metal sheet (e.g., a ground plane) is added behind the substrate, as depicted in the perspective view of FIG. 4B. The solid metal backing sheet creates multiple reflections between the metallic elements of the unit cells (e.g., unit cell 402) and the metal sheet for the incoming signals, resulting in a near-2π phase shift control on the reflection from the surface.

To understand the phase control capability, an example equivalent circuit model 404 is presented in FIG. 4C. Air and surface substrates are characterized as transmission lines with impedance $Z_0$=376.7Ω and $Z_1$ respectively. The substrate has thickness l and phase constant β. Incoming EM waves induce surface current on the pattern. Thus, the pattern can be characterized as a shunt circuit component with an admittance $Y_s$. The admittance is purely imaginary since the resistance of metallic patterns is negligible. The metal sheet terminates the substrate transmission line with zero resistance. Thus, the substrate and the metal sheet form a short-circuited transmission line, showing an impedance $Z_L$=j$Z_1$ tan(βl). Then, the surface can be modeled as two circuit components in parallel, with admittance $Y_s$ and impedance $Z_L$, respectively. The phase delay caused by the substrate is around $$\frac{\pi}{2},$$

so $$Z_L \approx jZ_1 \tan\left(\frac{\pi}{2}\right) = \infty j.$$

Thus, the equivalent impedance of the whole surface is as follows:

$$Z_S = \frac{1}{Y_s + 1/Z_L} \approx \frac{1}{Y_s} \tag{7}$$

The reflection from the surface can be modeled as the reflection between the air transmission line $Z_0$ and a load $Z_S$. The reflection coefficient Γ, i.e., the ratio between incoming signal $E_{in}$ and reflected signal $E_{out}$, is $$\Gamma = \frac{E_{in}}{E_{out}} = \frac{Z_S - Z_0}{Z_S + Z_0} = \frac{1/Y_s - Z_0}{1/Y_s + Z_0} \tag{8}$$

where $Y_s$ and $Z_0$ denote imaginary and real numbers, respectively. Note, ‖Γ‖=1, which means almost all incoming signal power is reflected. Then, the phase of Γ, which describes the phase shift between the incoming signal and reflected signals, is $$\angle\Gamma = 2\arctan\frac{1}{\text{Im}(Y_s)Z_0} + \pi \tag{9}$$

When the dimensions of the split ring pattern are altered, the admittance of the pattern $Y_s$ is effectively changed in a range of $$[-Y_s^-, Y_s^+] * j.$$

Thus, the feasible phase shift range is $$\Theta = 2\pi - 2\arctan\frac{1}{Z_0 Y_s^-} - 2\arctan\frac{1}{Z_0 Y_s^+} \tag{10}$$

which is near-2π when $Y_s$ has a sufficiently large tuning range.

A set of patterns with different surface admittance $Y_s$ to cover the near-2πphase range can be selected. Three pattern dimensions, i.e., ring radius (R), width (W), and gap (G), as shown in FIG. 4A, can be used to achieve a wide range of admittance values. High-frequency simulation software (HFSS) simulations can be used to evaluate the performance of different patterns.

Figure 5A:
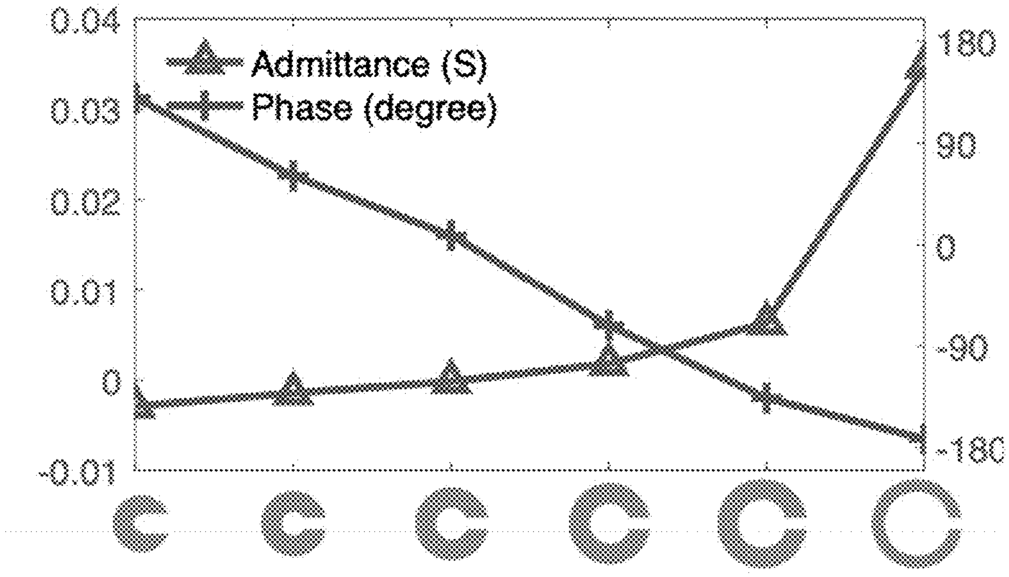
FIG. 5A illustrates the admittance and the corresponding phase shift of six patterns as an example.
Figure 5B:
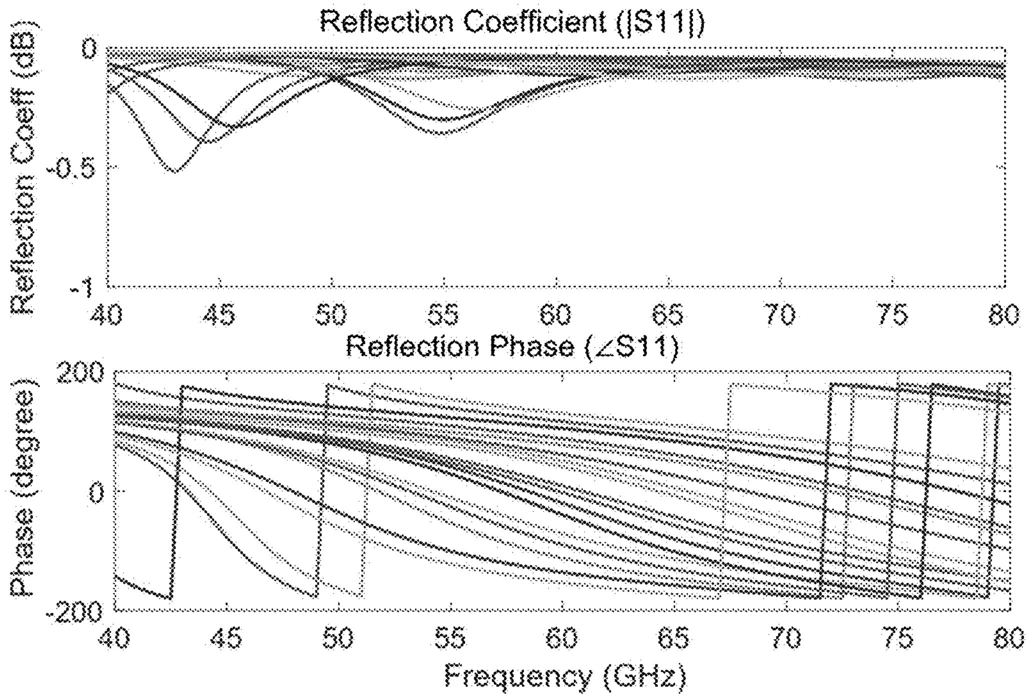
FIG. 5B illustrates simulation results for the six patterns.

FIG. 5A illustrates the admittance and the corresponding phase shift of six patterns as an example and FIG. 5B illustrates simulation results for the six patterns. The ring radius is changed from 0.6 mm to 1.1 mm with different widths (0.3-0.5 mm) and gaps (0.3-0.7 mm) to obtain admittance values from −0.005 S to 0.035 S. This results in a maximum phase error of 30 degrees, which is lower than many commercial devices and acceptable for wavefront manipulation. In some implementations, the phase shift could be adjusted continuously by changing the pattern dimension continuously. However, the fabrication precision is limited to around 0.1 mm. Fortunately, the different pattern dimensions have different effects on the admittance, so ring radius can be used for coarse phase control and width or gap adjustments can be used for fine control with a step size of 0.1 mm.

Another factor in selecting the patterns may include wideband performance. In some implementations, a passive metasurface should provide a high reflection coefficient and stable phase control over the wideband mmWave channels, e.g., from 58 GHz to 70 GHz for 802.11ad networks. A constant phase offset for all patterns does not change the beam pattern of the passive metasurface, so a constant phase difference needs to be maintained only among different patterns. The pattern dimensions, especially ring width, influence not only admittance but also wideband performance. In one example implementation, 18 patterns were selected among all possible patterns to cover a phase range of 300 degrees based on simulation results. The simulation results for the six patterns are shown in FIG. 5B. The six patterns exhibit high reflection power and constant phase difference among patterns from 57 GHz to 65 GHz, which is enough to cover IEEE 802.11ad/ay channels.

Given a set of patterns for phase control, the patterns can be combined to generate the passive metasurface design. In one example implementation, the spacing between patterns is set to 2.5 mm, i.e., half a wavelength. This roughly ensures no unwanted coupling occurs between different patterns. The optimization framework mentioned above provides the tuned or optimized phase configuration for each metasurface element. The phase configurations are mapped to corresponding element patterns and assembled into a large metasurface pattern array.

The substrate material and the fabrication method for producing the pattern are also considerations. The goal is to achieve a high-precision pattern compared to the mm Wave wavelength at a low cost. The standard printed circuit board (PCB) manufacturing process can produce high-precision patterns (up to 0.03 mm), but it is excessively expensive for making large metasurfaces. A 0.5 m×0.5 m RF PCB can cost more than $1000, mainly because it requires a special low-loss substrate for RF signals to travel along the wires on the board. However, metasurfaces work differently: RF signals do not travel along wires but through the thin substrate of the metasurface. This allows for the use of less expensive and more common dielectric substrates, such as paper and PVC plastic, which have higher loss but much lower cost. The patterns can be fabricated by printing on paper with a regular laser printer. The paper can then be hot-stamped with aluminum-based foils.

Figure 6:
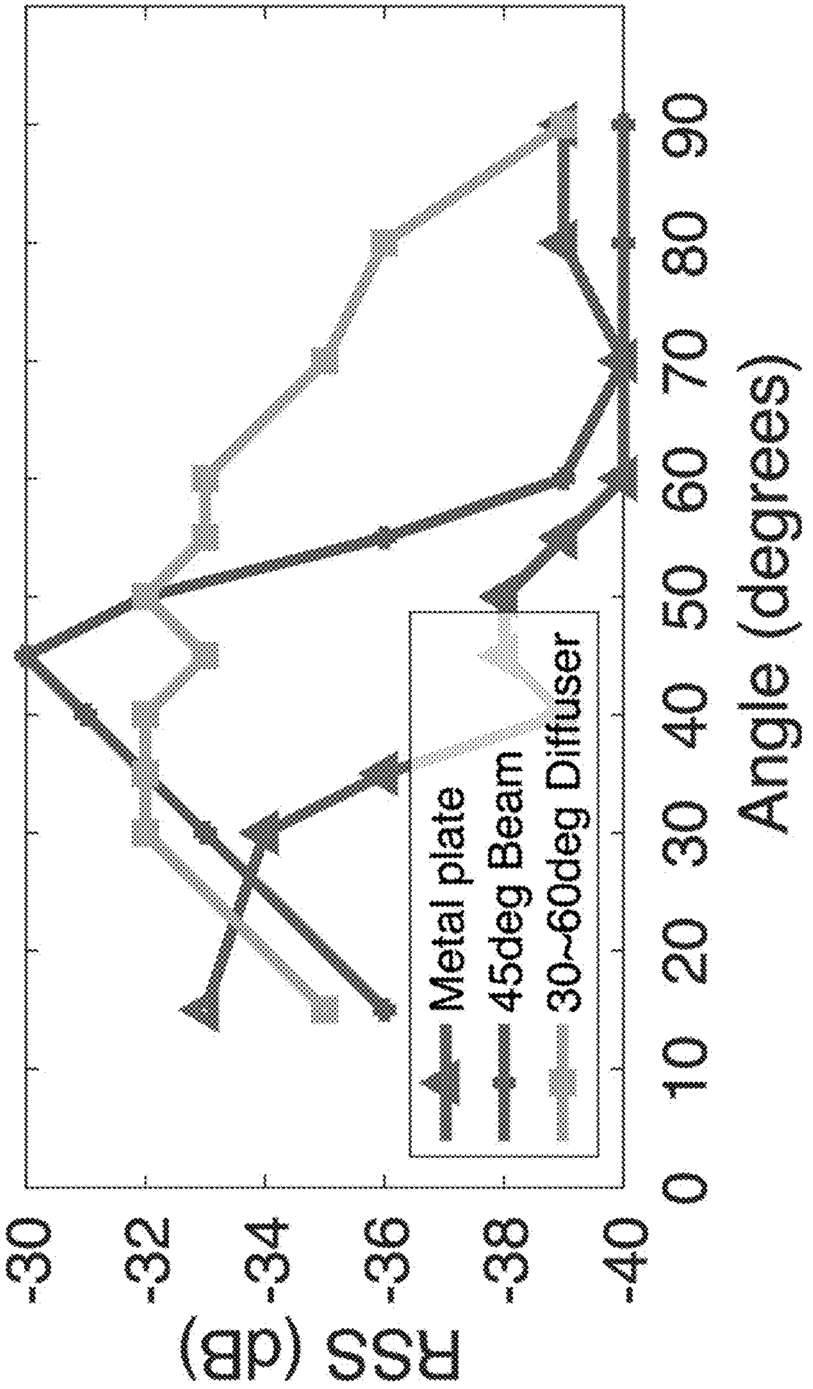
FIG. 6 illustrates a comparison of experimental angles to target angles for an example design.

FIG. 6 illustrates a comparison of experimental angles to target angles for an example design. To verify the metasurface designs, beam steering experiments can be conducted. Two metasurfaces are used: one that reflects the beam from the AP device at 45 degrees and another that produces a wide reflection beam from 30 to 60 degrees. Accordingly, FIG. 6 indicates that the experimental angles match the target angles well when compared to a metal plate that reflects the beam at 0 degrees. As the experimental measurements were made in a conference room, not an anechoic chamber, the exact gain of the metasurface beam steering is not considered, only the beam steering directions. The results confirm that the 2D metasurface design can apply the desired phase shifts to the reflected signals.

Some mobile devices (e.g., smart phones and tablet computers) are equipped with a light detection and ranging (LiDAR) sensor to provide 3D depth information. For example, RoomPlan is an application programming interface (API) provided by Apple® that runs a machine learning (ML) algorithm on both LiDAR and red/green/blue (RGB) camera information to generate 3D room plan information. Many mobile apps, e.g., Polycam, have been developed to create 3D models of real-world environments by leveraging this feature. Such off-the-shelf solutions can be used to implement the 3D environment modeling as input for the signal-enhancing methodologies disclosed herein.

The reflection behavior of common building materials in indoor and outdoor environments affects the propagation of the mmWave radio channels. Literature values for the reflection characteristics of each material are used for simulations. For real-world experiments, the reflection coefficients of the materials are measured using mm-Wave endpoints. A rough estimation of whether a material is a strong or weak reflector has been found to be sufficient for implementation purposes. Mobile devices with mmWave connectivity could also incorporate reflection measurement capabilities. Alternatively, the user can scan the 3D environment and record the mmWave RSS measurements, which could then be used to infer the reflection coefficients of the materials (inference).

Figure 7:
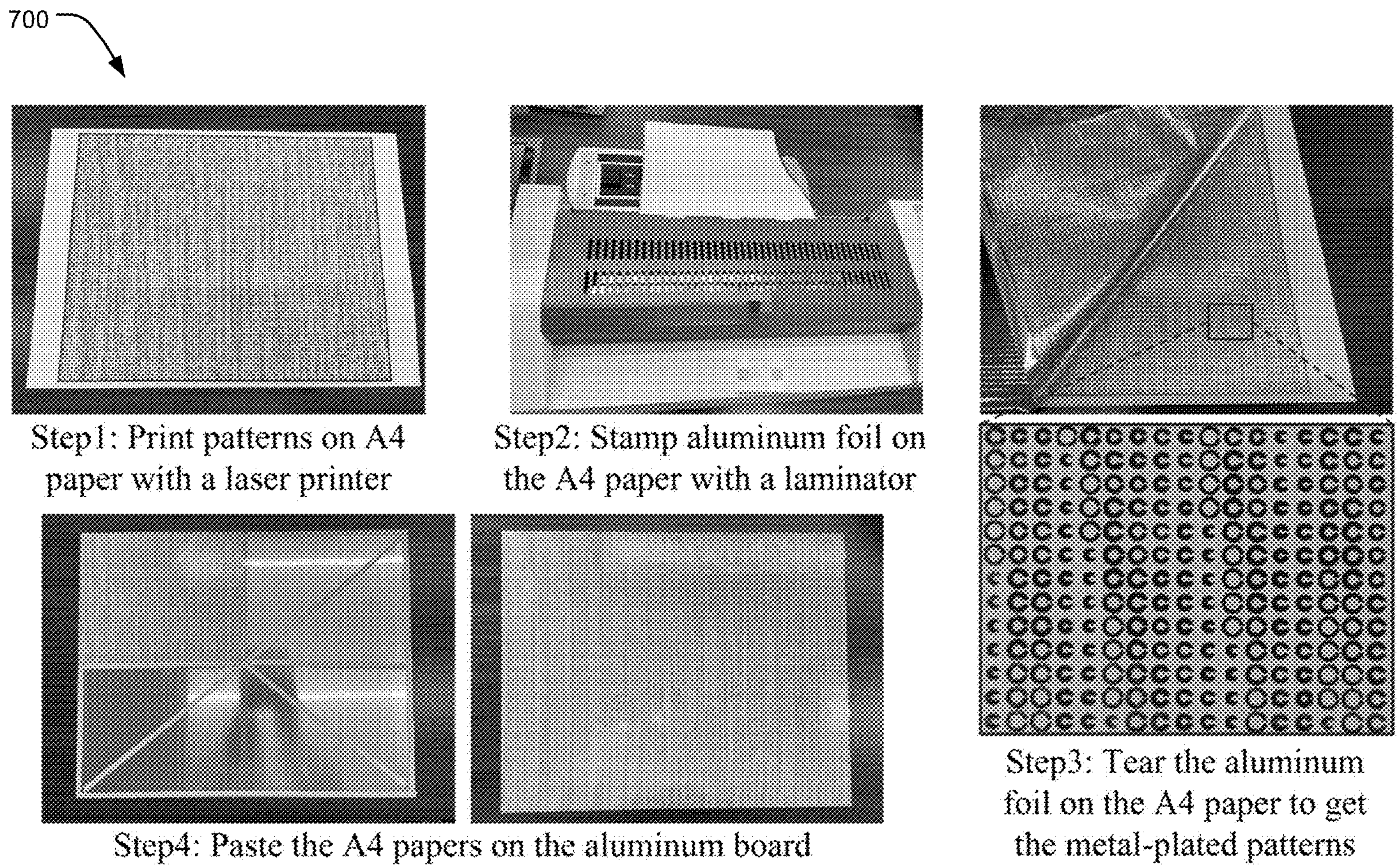
FIG. 7 illustrates example operations for fabricating an example passive metasurface.

FIG. 7 illustrates example operations 700 for fabricating an example passive metasurface. As noted above, for metasurface fabrication, metallic patterns are printed on paper substrates that induce different reflection phases to form an element array that constitutes the metasurface, as shown in FIG. 7. A laser printer can be used to print the metasurface pattern onto a standard sheet of office printer paper (~0.075 mm thick). The type and amount of ink affect the quality of hot stamping-more ink usually leads to better metallic patterns. Next, an aluminum-based hot-stamping foil is placed over the printed patterns, and both sheets are passed through a laminator. At a high temperature (around 270° C.), the metallic powders on the foil adhere to the printer ink. After removing the foil, metallic patterns are transferred onto the paper. A plastic sheet (~0.25 mm) may be bonded to the paper layer to increase substrate thickness. The plastic layer may then be adhered to a thin metal ground plane sheet.

The price of existing solutions for mm Wave coverage enhancement is comparable to or higher than that of a mmWave AP device, which discourages their deployment. For example, mmWall consists of 76×28 elements, each having two MAVR-000120-14110P varactors, while each low-loss varactor for mm Wave costs $2.4. This leads to a material cost of $10000 for varactors alone. Passive metasurfaces offer a very low-cost alternative for coverage enhancement. However, a 10×10 $cm^2$ MilliMirror sample with 80×80 elements costs about $15, i.e., around $300 for a 40 cm×50 cm surface, and is fabricated by specialized hot-stamping metallic patterns onto substrates. In contrast, a 40 cm×50 cm metasurface with 160×200 elements fabricated according to the laser printing and stamping methodology described herein costs only around $3 and uses common materials and tools. The cost includes hot stamping foils ($0.1), printer papers ($0.1), a PVC sheet ($1), and a 1 mm thick metal plate ($2). The cost could be much lower for mass production due to the economy of scale. Furthermore, while a thick metal plate can be used to stabilize the paper-plastic metasurface and simplify manual fabrication, a very thin metal sheet is sufficient for the ground metal plane and results in a lower manufacturing price. Such low-cost design enables the massive deployment of metasurfaces as an effective solution for mmWave coverage enhancement.

Figure 8A:
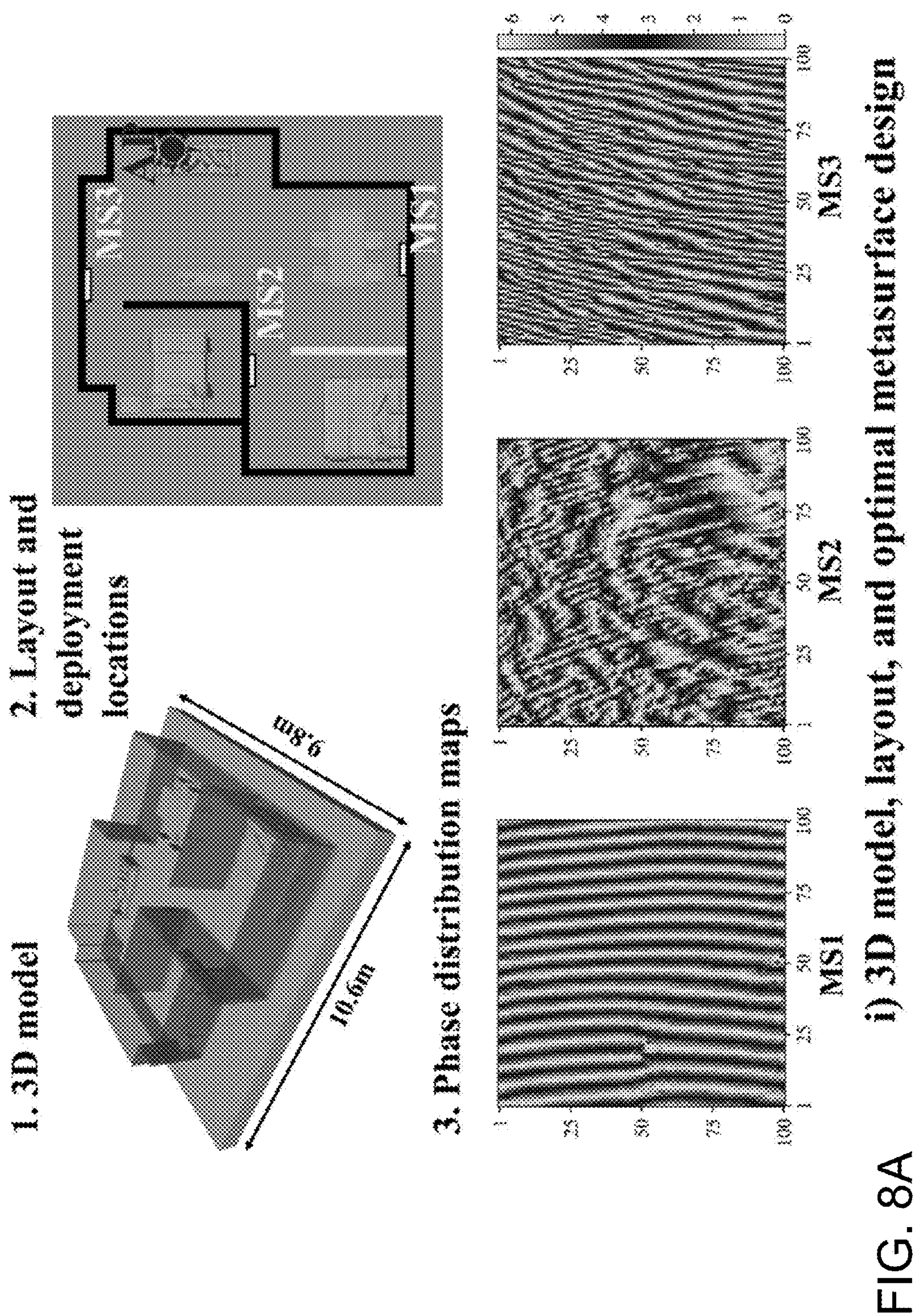
FIG. 8A illustrates an example 3D model, layout, and metasurface design for an indoor device.
Figure 9A:
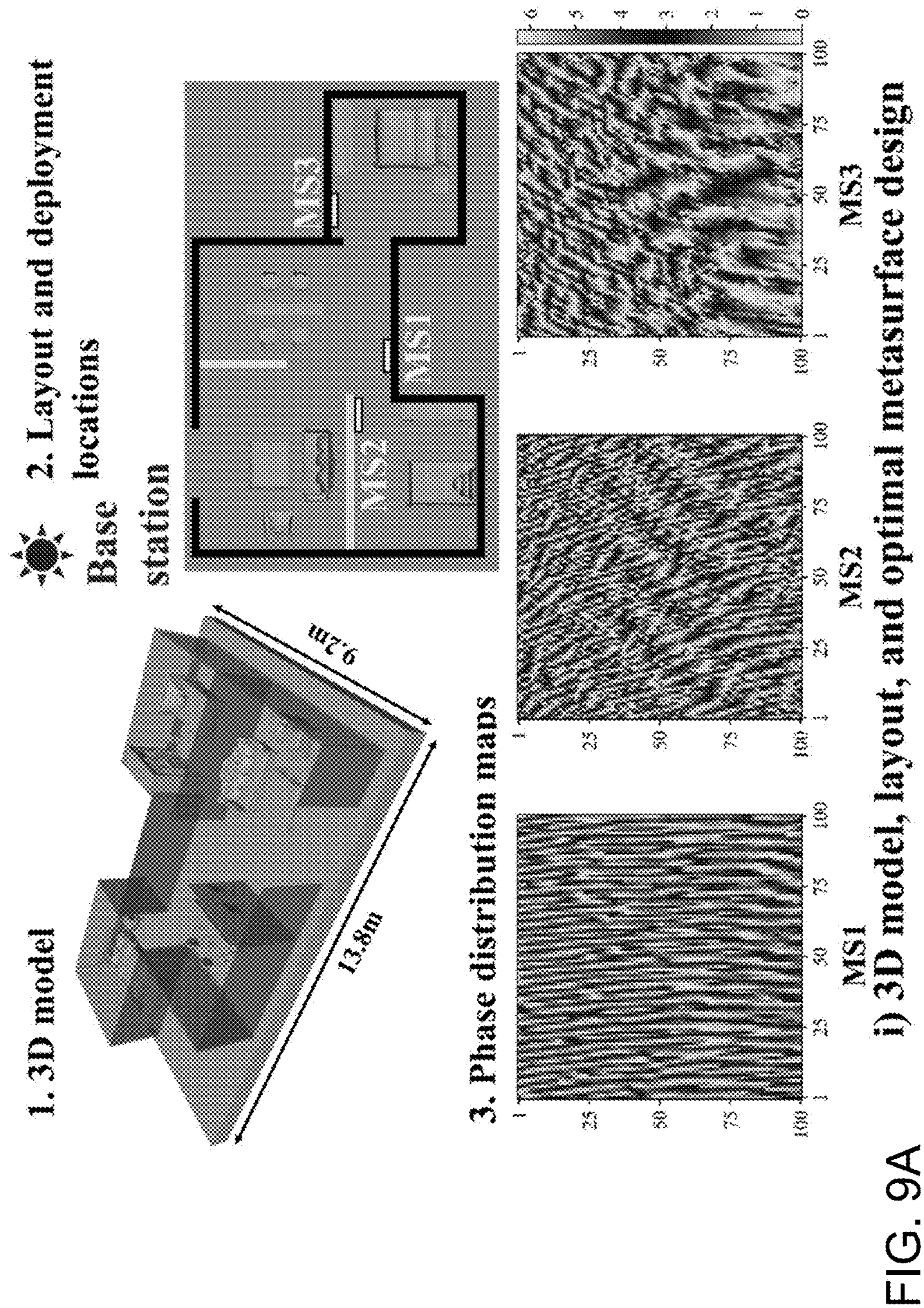
FIG. 9A illustrates an example 3D model, layout, and metasurface design for an outdoor base station external to the environment.

FIG. 8A illustrates an example 3D model, layout, and metasurface design for an indoor device and FIG. 9A illustrates an example 3D model, layout, and metasurface design for an outdoor base station external to the environment. Both simulation and testbed experiments were used for the evaluation of the example methodologies disclosed herein. Simulation provides an understanding of approaches under diverse environments and settings, while the testbed provides for evaluation of performance in realistic scenarios. For example, in one experiment, 3D models of different rooms are obtained from a public 3D scene dataset and fed into a wireless channel simulator to estimate the RSS across the entire space of interest. Two 3D scene models were selected to simulate two common mm Wave communication systems: one through an indoor mmWave AP device and the other through an outdoor mm Wave base station device. In the simulation, the phased array size was set as 6×6 for the indoor AP device and 25×25 for the outdoor base station device. The transmitter location was fixed during the simulation, and the optimal metasurface design and deployment configuration for each scene is generated iteratively by the phase map optimizer algorithm in conjunction with the hyper tuner of FIG. 1 to obtain the maximum coverage performance.

Figure 8B:
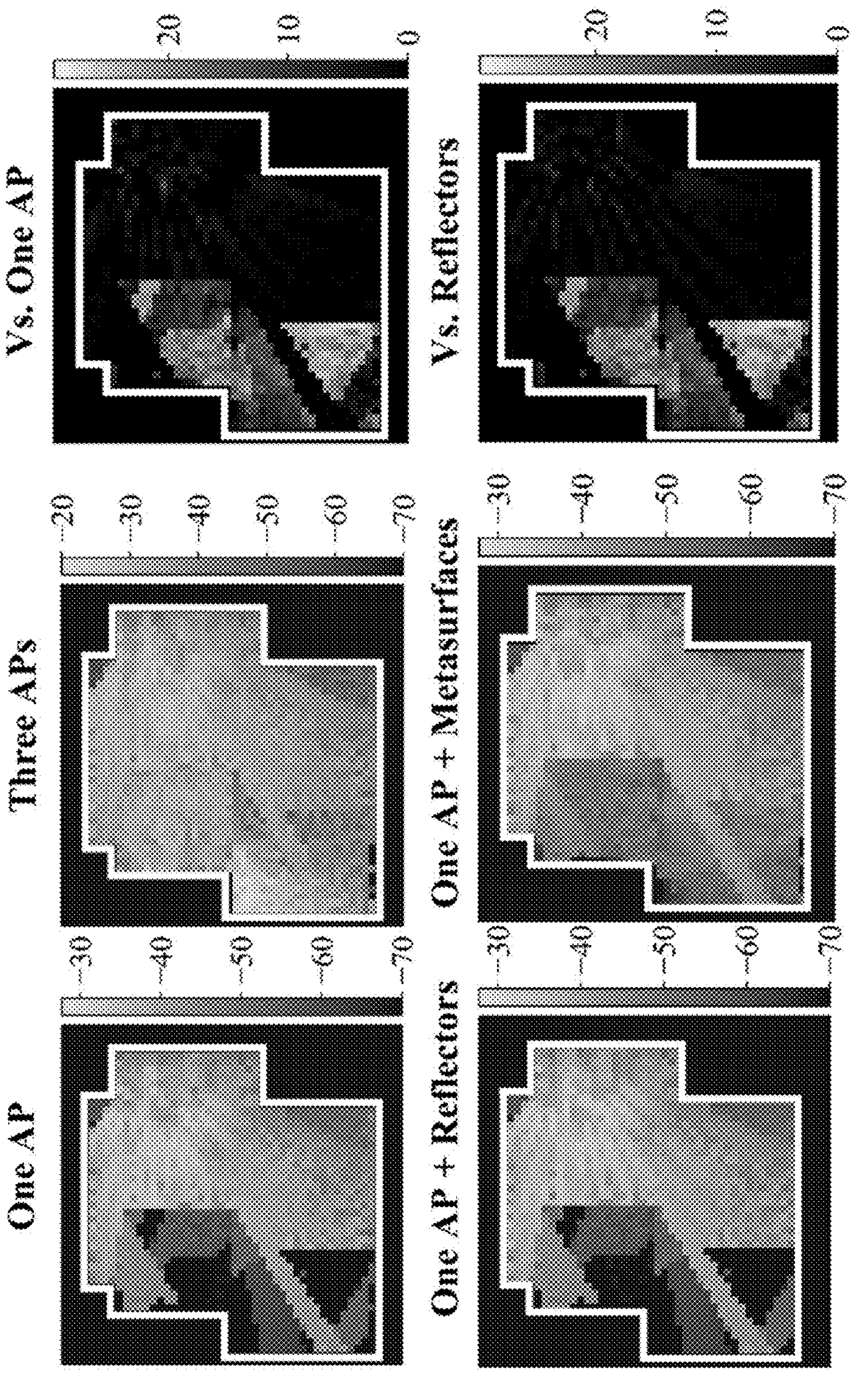
FIG. 8B illustrates example RSS heatmaps and the RSS gain for a single AP device, multiple AP devices with multiple metal reflective surfaces, and an optimized metasurface for an indoor device.
Figure 9B:
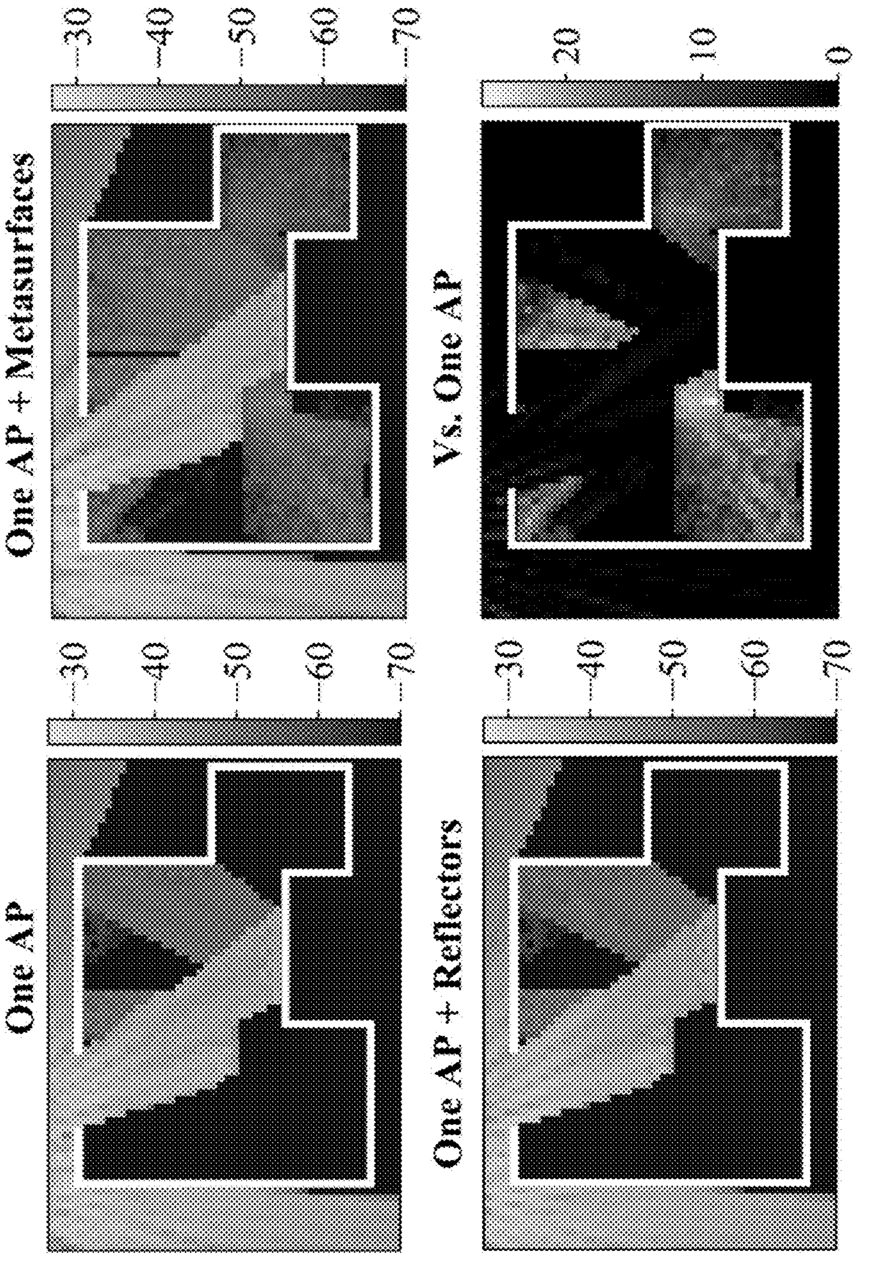
FIG. 9B illustrates an example RSS heatmaps and the RSS gain for a single AP device, multiple AP devices with multiple metal reflective surfaces and an optimized metasurface for an outdoor base station external to the environment.

FIG. 8B illustrates an example RSS heatmaps and the RSS gain for a single AP device, multiple AP devices with multiple metal reflective surfaces, and a tuned or optimized metasurface for an indoor device, and FIG. 9B illustrates an example RSS heatmaps and the RSS gain for a single AP device and multiple AP devices with multiple metal reflective surfaces and a tuned or optimized metasurface for an outdoor base station external to the environment. Deployment of multiple AP devices can certainly achieve full coverage indoor, but the cost is very high. With the deployment of some metal reflective surfaces on the walls, the coverage enhancement effect is especially weak due to the fact that the metal reflective surfaces can only provide mirror reflection for the mmWave beam. Automated design metasurface output from the methodologies disclosed herein can achieve a much greater coverage enhancement effect, which basically covers all the NLOS area and has an average gain of 25 dB.

Figure 8C:
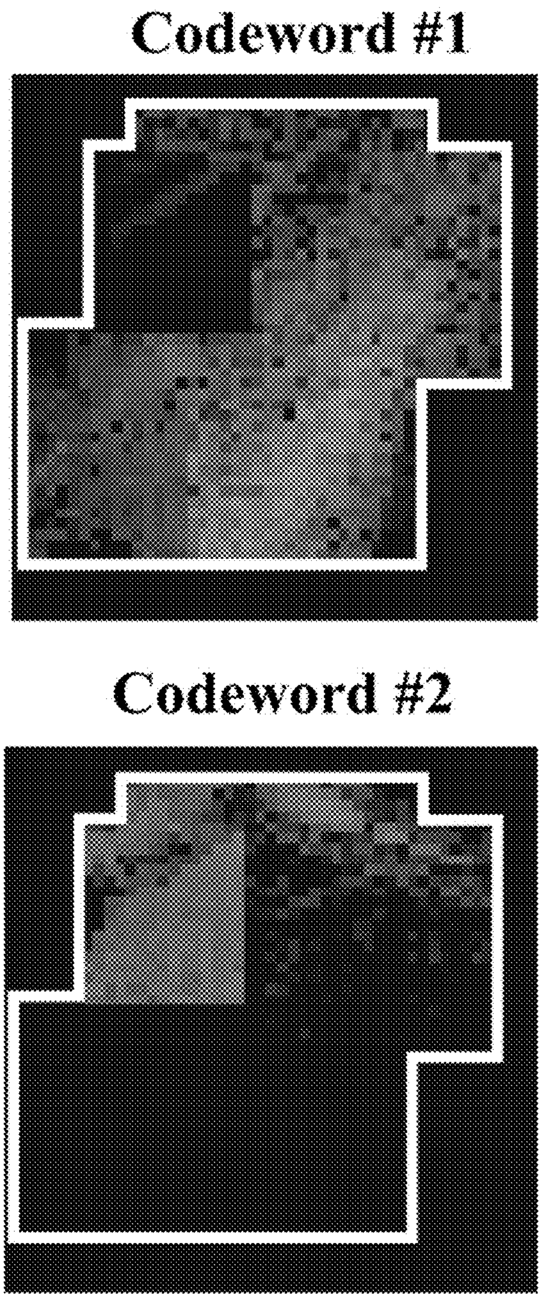
FIG. 8C illustrates example coverage heatmaps using two different codewords for an indoor device.
Figure 9C:
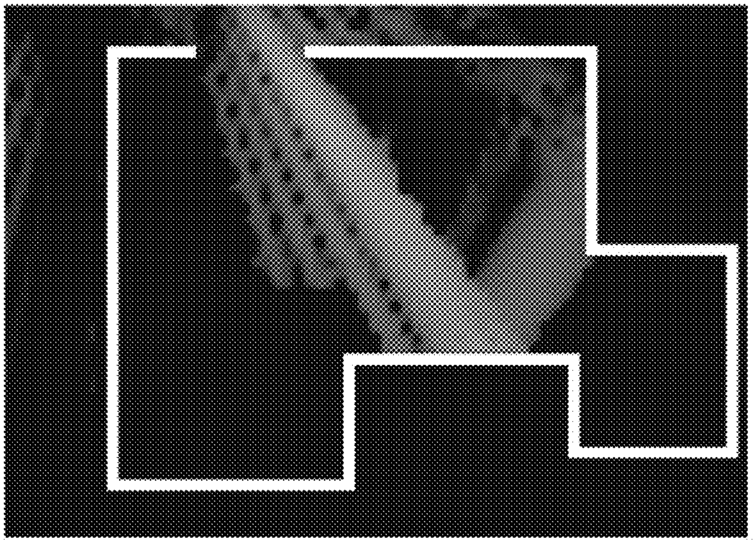
FIG. 9C illustrates example coverage heatmaps using two different codewords for an outdoor base station external to the environment.
Figure 9C:
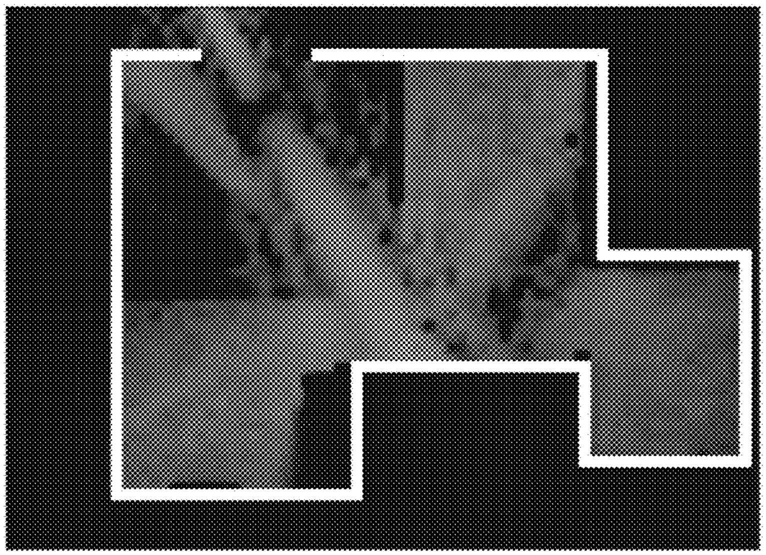

FIG. 8C illustrates example coverage heatmaps using two different codewords for an indoor device, and FIG. 9C illustrates example example coverage heatmaps using two different codewords for an outdoor base station external to the environment. The metasurfaces designed can cover different regions when corresponding to different beamsteering codewords of the AP device. As shown in FIG. 8C, when the AP device is equipped with codeword #1, MS1 and MS2 help the AP device cover one of the blind areas (i.e., the lower left bedroom); when the codeword is #2, MS1 and MS3 help the AP device cover the other blind areas (i.e., the upper left bedroom). When the code word is other, the AP device mainly serves the living room area. Similarly, as shown in FIG. 9C, when the outdoor base station device sets codeword #2 as opposed to codeword #1, it can achieve simultaneous coverage of the blind areas with the help of MS1, MS2, and MS3.

Figure 10:
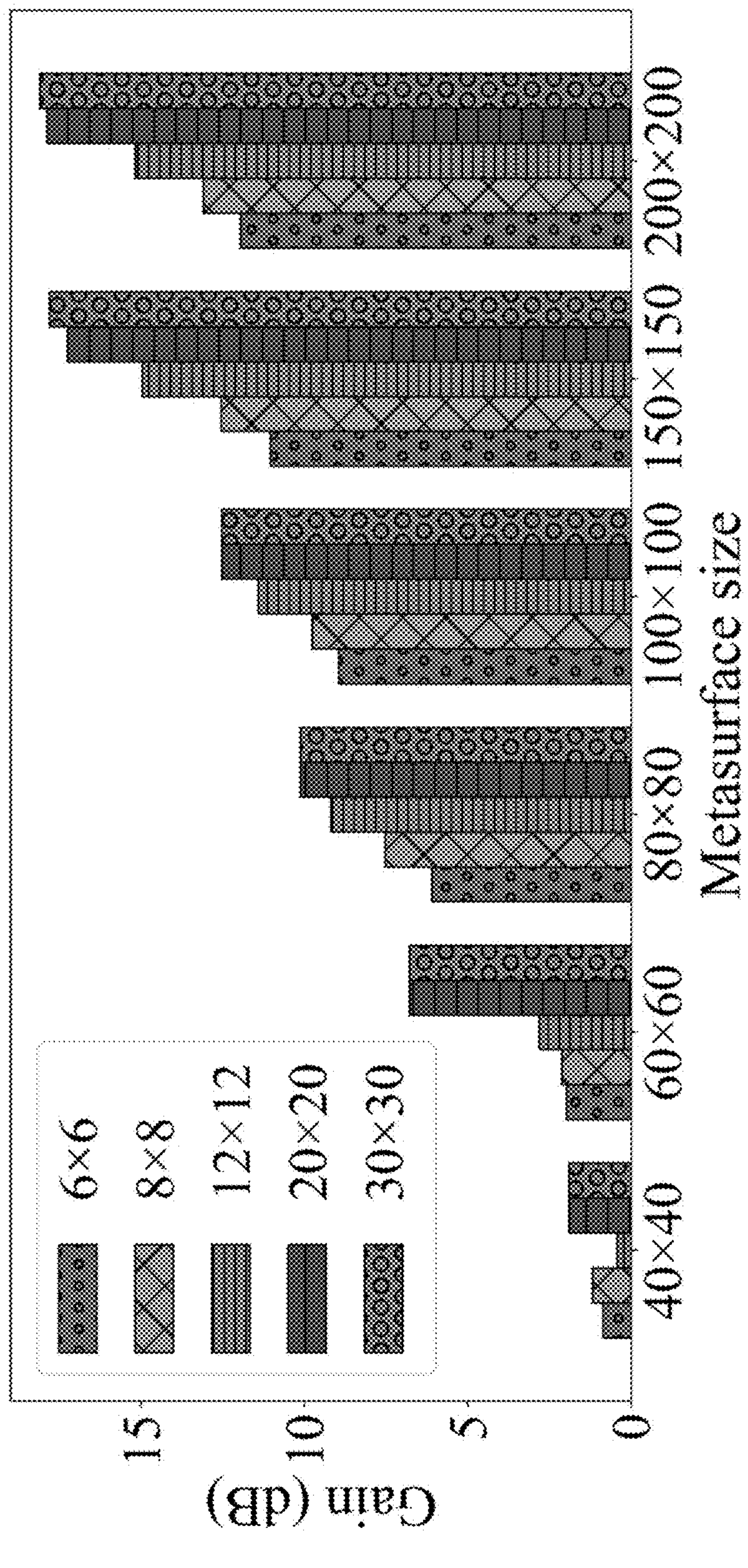
FIG. 10 illustrates example relationships between gain and metasurface size.

FIG. 10 illustrates example relationships between gain and metasurface size. In an example experiment, the phased array size and metasurface size were both varied to compare the coverage performance gain from the metasurface deployment. In this experiment, three metasurfaces were deployed at optimal locations in an environment. Experimental results show that when the metasurface size is relatively large, the performance of coverage can be improved by increasing the size of the phased array. When the phased array is relatively small, using metasurfaces with the size of 150×150 elements in the environment achieved almost optimal results, and the gain from continuing to increase the size of the metasurface was not significant. Thus, when performing automatic metasurface design optimization, it can be useful to add a penalty for large metasurface sizes. Of course, the system can be weighted to use larger metasurfaces to achieve the best coverage performance.

Figure 11A:
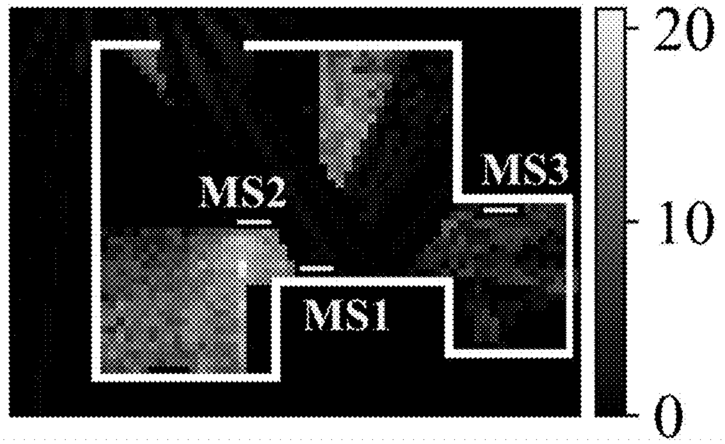
FIGS. 11A-11C illustrate results of experiments on how metasurface placement affects the coverage enhancement performance.
Figure 11B:
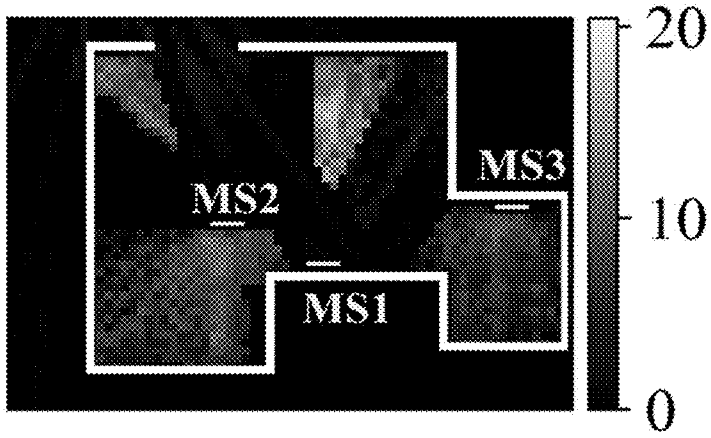
Figure 11C:
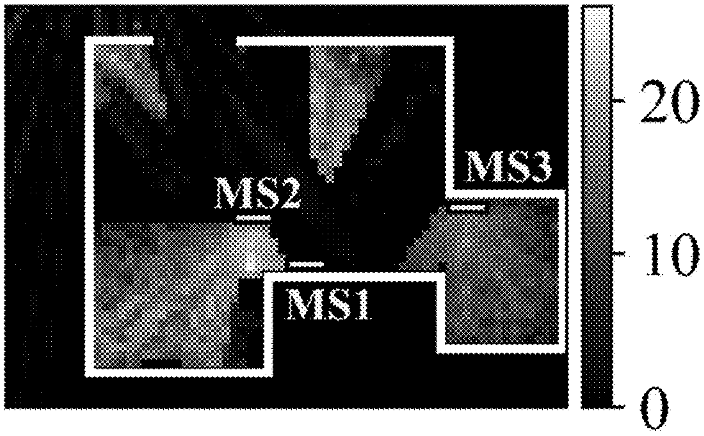

FIGS. 11A-11C illustrate results of experiments on how metasurface placement affects the coverage enhancement performance. To investigate how the metasurface placement affects the coverage enhancement performance and verify the effectiveness of the system on automated designs, comparison experiments were conducted in the simulation environment of FIG. 9A. Two different placement configurations were selected based on expert recommendations for the placement of each of three metasurfaces in an environment. These placements were compared with an optimal placement configuration that maximizes the coverage gain calculated by the enhancement methodologies disclosed herein. The results indicate that the placement choice sets a limit on the potential gain of the metasurface. By optimizing the metasurface pattern, a median gain of 6.7 dB and 8.9 dB to the blind area can be achieved in the random placement setting of FIGS. 11A and 11B, respectively, and a median gain of 11.6 dB in the optimal placement scenario of FIG. 11C, using the same metasurface size.

Figure 12A:
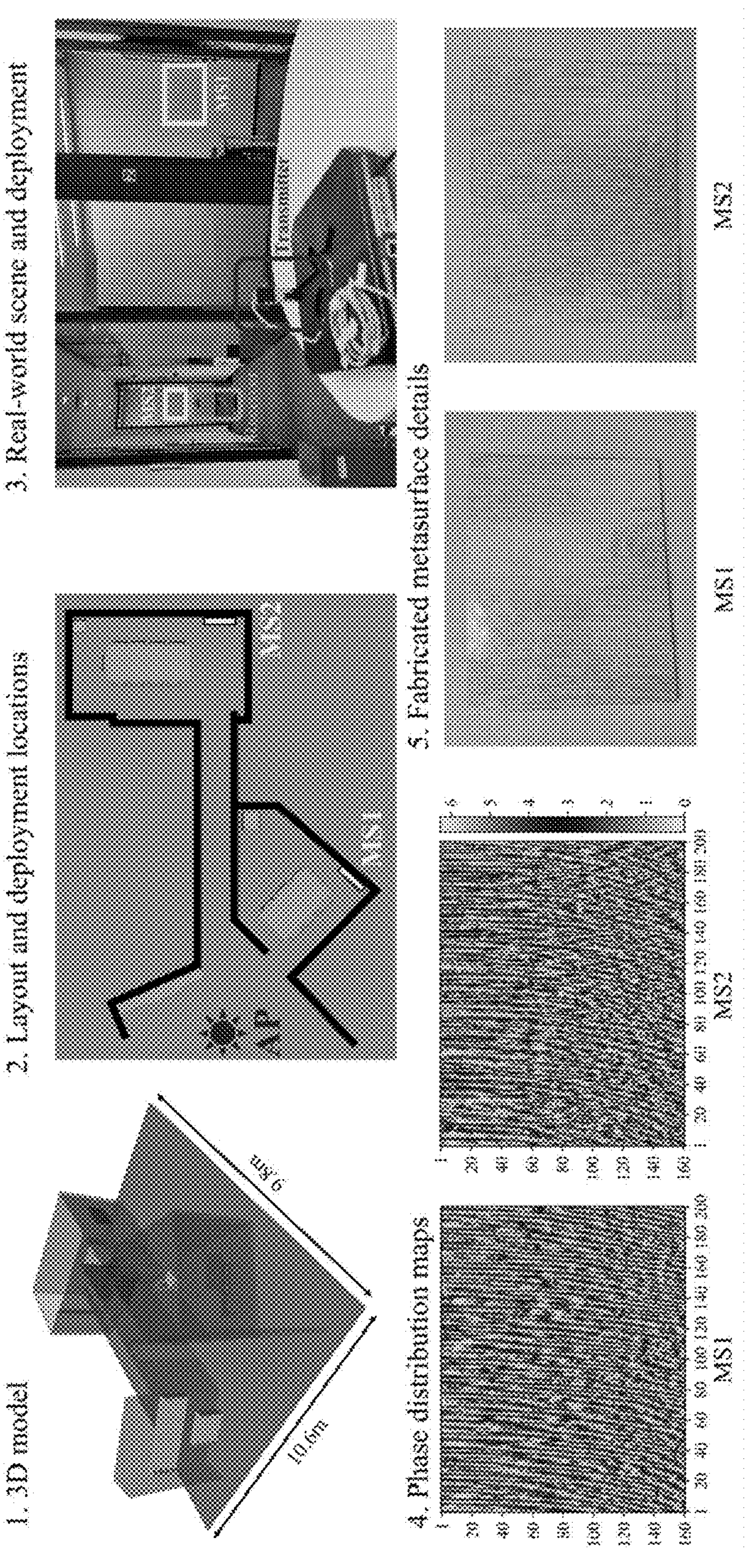
FIGS. 12A-C and FIGS. 13A-C illustrate experiments were conducted in two indoor scenarios.
Figure 12B:
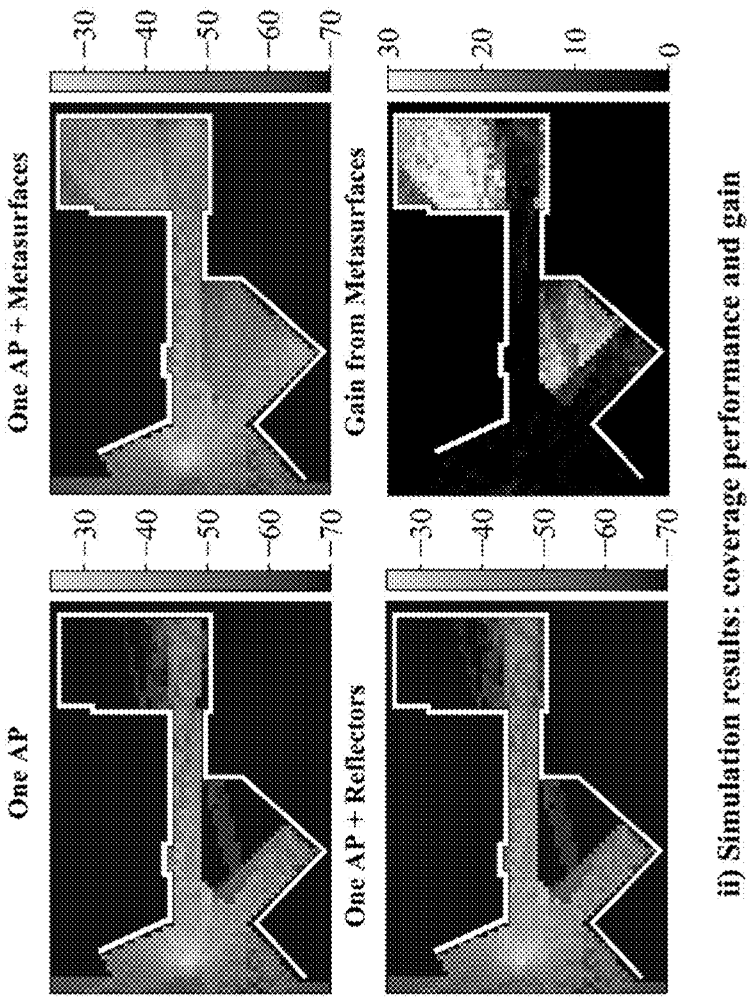
Figure 12C:
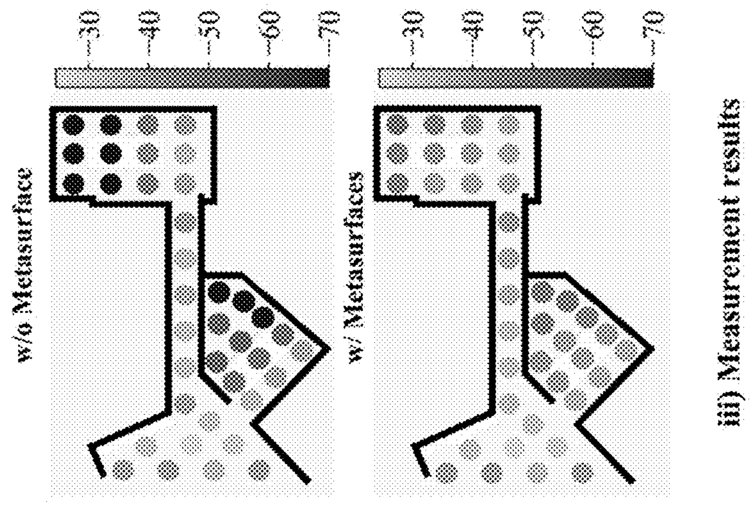
Figure 13A:
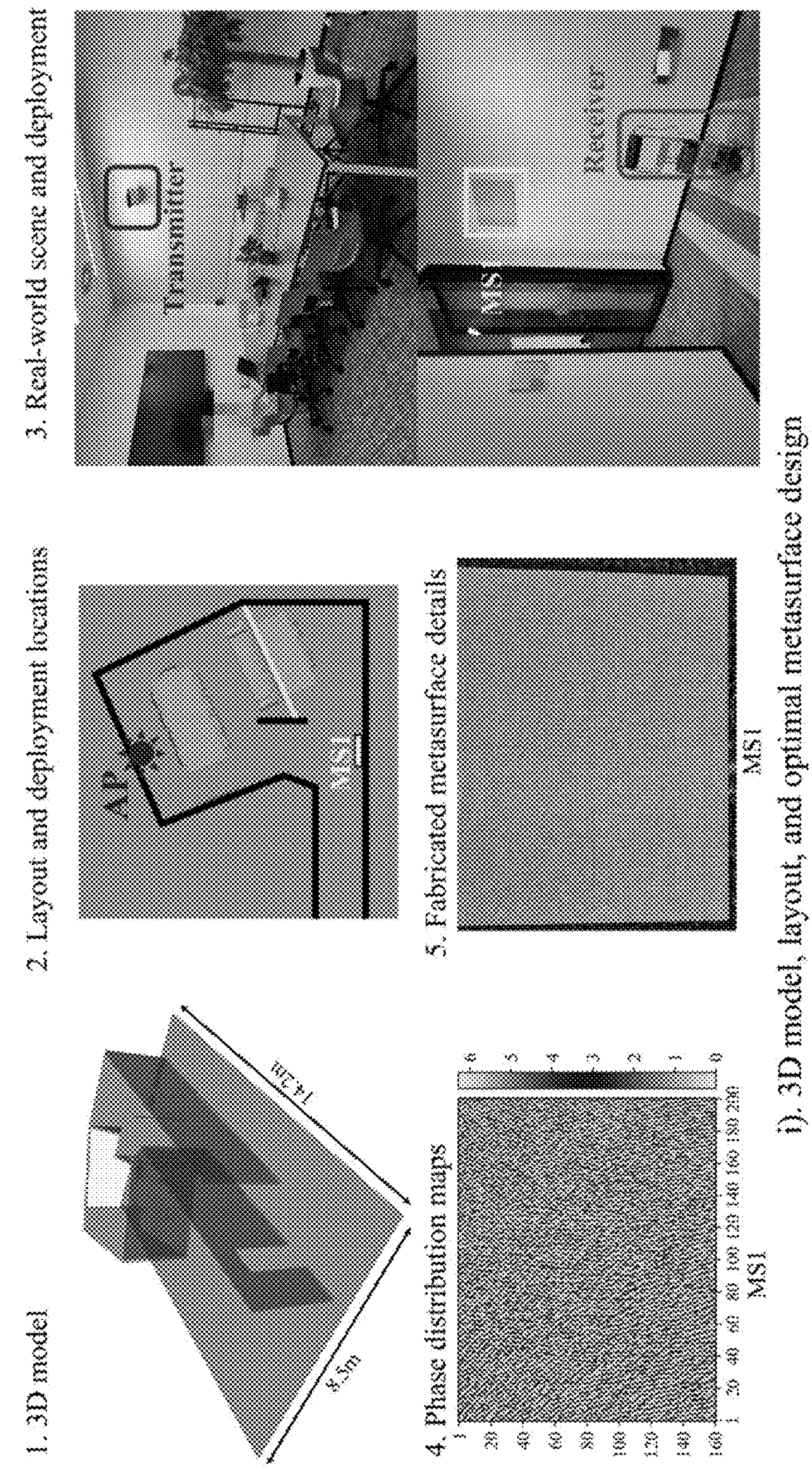
Figure 13B:
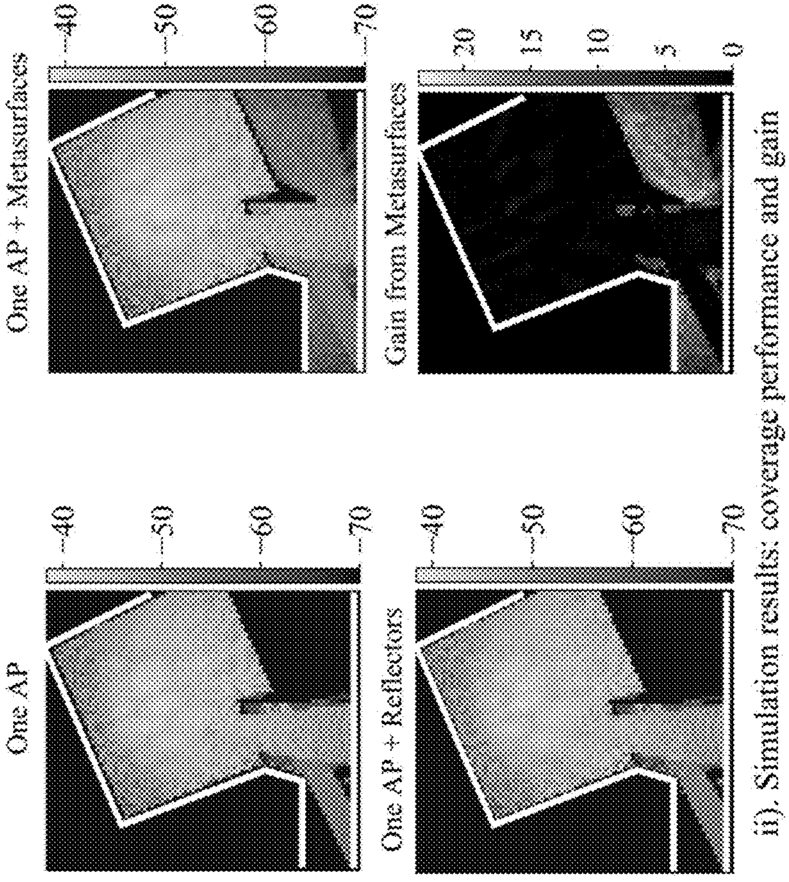
Figure 13C:
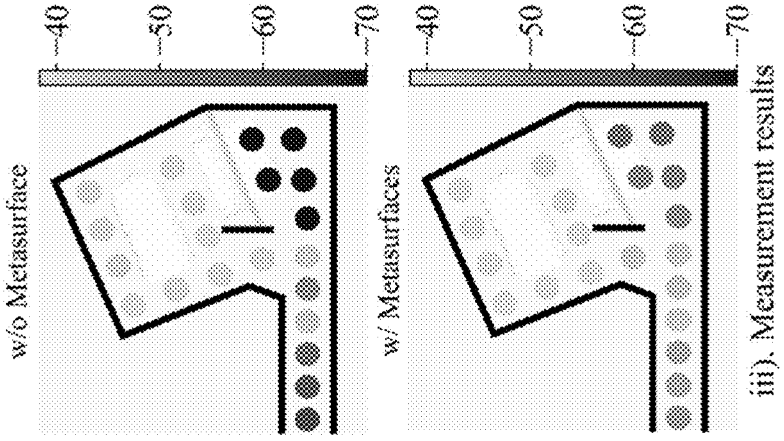

FIGS. 12A-C and FIGS. 13A-C illustrate experiments were conducted in two indoor scenarios. The Polycam application was used to obtain the 3D models of the experimental environment. Based on the 3D models, the system generates the optimal metasurface phase map and deployment locations. The metasurfaces were fabricated and deployed accordingly. The AP device was placed at typical AP device deployment locations in an office environment, such as in a shared office area or in a conference room. The receiver RSS was measured at different locations with and without metasurfaces. Since commercial AP devices can only report RSS above −70 dBm, −70 dBm is used as the baseline value for RSS gain calculation when the receiver fails to report RSS, meaning the wireless connection is lost. In a first scenario depicted in FIG. 12A, the AP device is in an open office area, and the tuned or optimized metasurface placement extends the coverage to nearby conference rooms, as shown in the simulation of FIG. 12B and in actual experimental measurements recorded in FIG. 12C. In a second scenario depicted in FIG. 13A, the AP device is in a conference room, and the tuned or optimized metasurface placement extends the coverage to the hallway and a neighboring room, as shown in the simulation of FIG. 13B and in actual experimental measurements recorded in FIG. 13C.

For both scenarios of FIGS. 12A and 13A, the baseline values, i.e., RSS values without metasurfaces, match well with simulated coverage results (see FIGS. 12B and 13B). In regions where LoS paths are blocked, the baseline RSS values are very low and cause connectivity problems. However, when metasurfaces are deployed, the mm Wave coverage in the adjacent conference rooms (FIG. 12C) and the hallway (FIG. 13C) is enhanced, as predicted by the simulation. Tuned or optimized metasurface design and placement improves the median RSS at such areas by about 9.5 dB.

Figure 14:
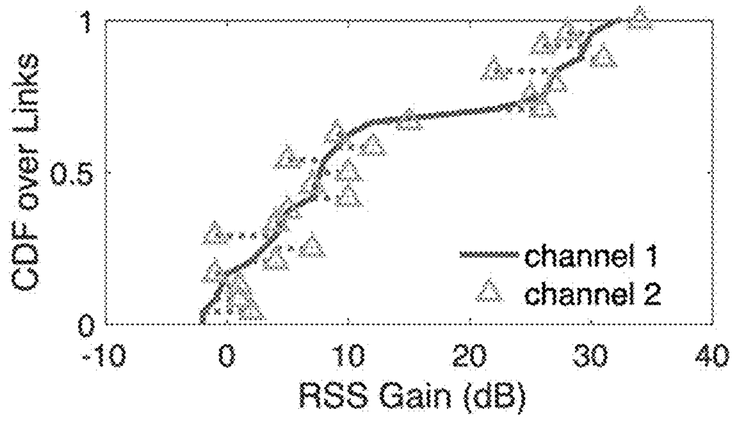
FIG. 14 illustrates example metasurfaces that provide a median of and up to RSS gain.

RSS measurements were collected on both channel 1 and channel 2 of the 802.11ad protocol for the scenario of FIG. 12A. Since the unit cell design of the metasurface supports wideband phase control, the RSS gain applies to multiple channels alike. The metasurfaces provide a median of 6 dB and up to 30 dB RSS gain, as shown in FIG. 14.

Figure 15:
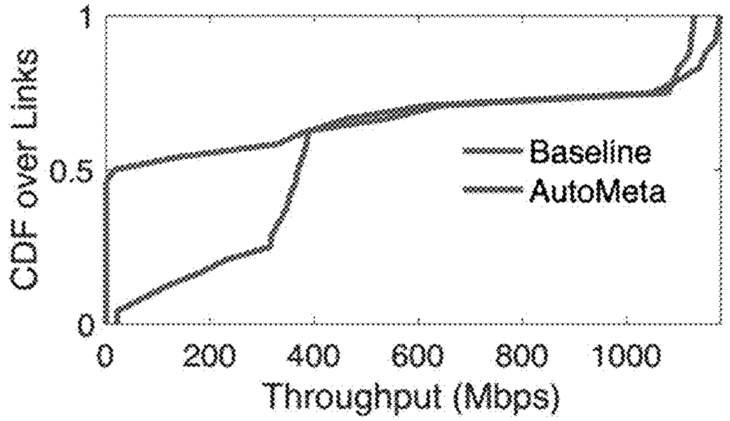
FIG. 15 illustrates examples of median throughput improvement from 77.2 Mbps to 373 Mbps.

Throughput improvements are also achieved by tuned or optimized metasurface placement. TCP measurements were calculated for receiver positions inside conference rooms from the configuration of FIG. 12A. Commercial mmWave devices fail to establish a network or TCP connection when RSS is lower than −55 dBm. The tuned or optimized metasurface design clearly benefits such unreliable links that have low or no throughput; it improves the RSS to provide a reliable TCP connection with high throughput. As shown in FIG. 15, the median throughput improves from 77.2 Mbps to 373 Mbps.

Figure 16:
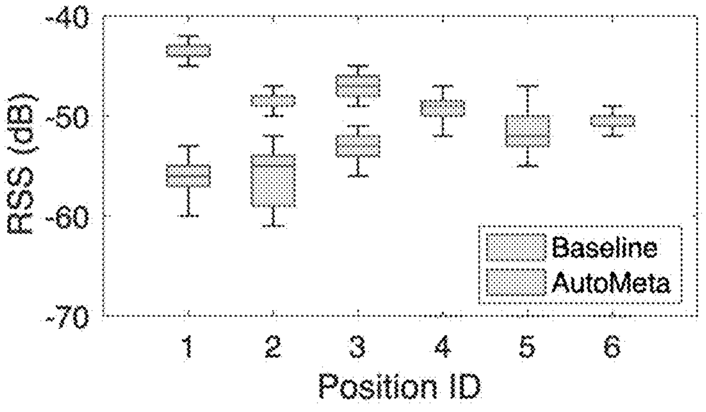
FIG. 16 indicates that the optimization of example metasurface placement consistently improves the performance over the baseline despite human mobility.

Static wall blockage is not the only challenge for mm Wave connectivity. mmWave links can also be disrupted by human mobility, e.g., in conference rooms or hallways. In the scenario of FIG. 13A, both AP devices and the metasurfaces were mounted at a height of more than 2 m, i.e., on the ceilings. This allows the transmitted AP device signals to reach the metasurface using the space above the human movement area. In this way, the reliability of links was increased. To cover the receiver locations, the metasurface directs the beam toward the ground. One hundred RSS measurements for six locations were conducted in the hallway of FIG. 13A, while people are walking in the hallway. FIG. 16 indicates that the optimization of metasurface placement consistently improves the performance over the baseline despite human mobility.

Figure 17:
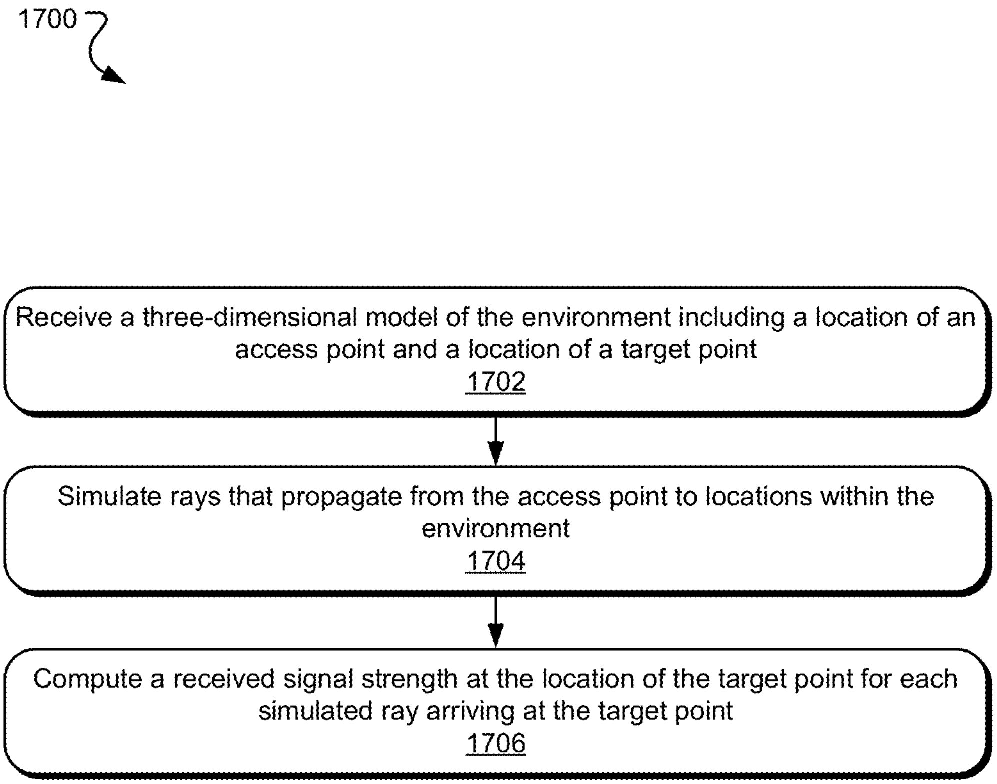
FIG. 17 illustrates example operations for designing a passive metasurface system within an environment.

FIG. 17 illustrates example operations 1700 for designing a passive metasurface system within an environment. A receiving operation 1702 receives a three-dimensional model of the environment including a location of an access point and a location of a target point. A simulation operation 1704 simulates rays that propagate from the access point to locations within the environment. At least some of the rays are simulated to propagate through one or more passive metasurfaces within the environment and to yield attenuation and phase of each ray propagating through the one or more passive metasurfaces. A signal strength operation 1706 computes a received signal strength at the location of the target point for each simulated ray arriving at the target point within the environment based on the attenuation and phase of each simulated ray propagating through the one or more passive metasurfaces.

In some implementations, the three-dimensional model of the environment further includes locations of the one or more passive metasurfaces. The three-dimensional model of the environment may also include one or more objects including at least one passive metasurface of the one or more passive metasurfaces.

In some implementations, the method includes measuring a received signal strength at each object in the environment and tuning a propagation coefficient for each object in the three-dimensional model to minimize error between the received signal strength measured at each object in the environment and received signal strength simulated at each object for the at least some of the rays. In some implementations, the propagation coefficient for each object is initialized based on a material type detected on an exterior surface of the object using computer vision and is refined using a gradient descent algorithm.

Design configurations of the one or more passive metasurfaces may include metallic pattern distributions within the one or more passive metasurfaces, and tuning of the propagation coefficient for each object in the three-dimensional model can include tuning a number of the one or more passive metasurfaces placed within the environment, positions of the one or more passive metasurfaces placed within the environment, and the design configurations of the one or more passive metasurfaces placed within the environment to maximize received signal strength at the target point in the environment.

In some implementations, the method may include tuning the access point with respect to the one or more passive metasurfaces to maximize received signal strength at the target point in the environment based on the placement of the access point within the environment and on a codebook of transmission signal properties of signals transmitted by the access point. Such tuning may include a search based on simulated annealing, Bayesian optimization, or a genetic algorithm. The tuning may also or alternatively include tuning includes maximizing signal-to-noise ratio of signals transmitted from the access point to the target point or the capacity of a communication link between the access point and the target point.

Figure 18:
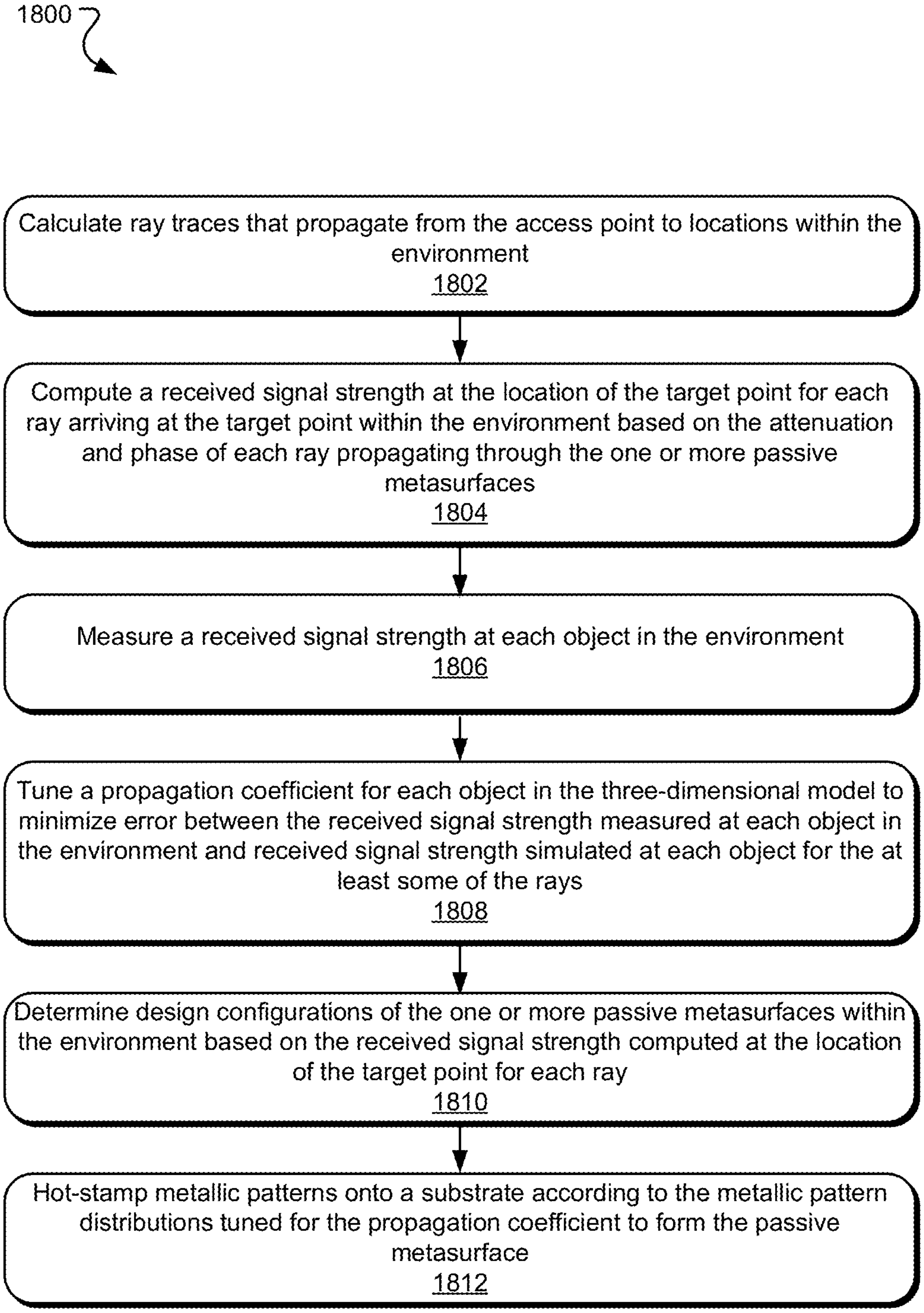
FIG. 18 illustrates example operations for designing a passive metasurface system for placement within an environment represented by a three-dimensional model of the environment.

FIG. 18 illustrates example operations 1800 for designing a passive metasurface system for placement within an environment represented by a three-dimensional model of the environment. The three-dimensional model includes a location of an access point and a location of a target point and further includes one or more objects, the one or more objects including at least one passive metasurface. A calculation operation 1802 calculates ray traces (e.g., simulates rays within the environment) that propagate from the access point to locations within the environment. At least some of the rays are simulated to propagate via the one or more objects within the environment and to yield attenuation and phase of each ray propagating through the one or more passive metasurfaces. A signal strength operation 1804 computes a received signal strength at the location of the target point for each ray arriving at the target point within the environment based on the attenuation and phase of each ray propagating through the one or more passive metasurfaces. A measuring operation 1806 measures a received signal strength at each object in the environment.

A tuning operation 1808 tunes a propagation coefficient for each object in the three-dimensional model to minimize error between the received signal strength measured at each object in the environment and received signal strength simulated at each object for the at least some of the rays. The propagation coefficient of the passive metasurface is based at least in part on metallic pattern distributions within the passive metasurface. A determining operation 1810 determines design configurations of one or more passive metasurfaces within the environment based on the received signal strength calculated at the location of the target point for each ray. The previously-described operations are included in a method of designing a passive metasurface system for placement within an environment represented by a three-dimensional model of the environment.

In addition, by adding an optional forming operation 1812 that hot-stamps metallic patterns onto a substrate according to the metallic pattern distributions tuned for the propagation coefficient to form the passive metasurface, FIG. 18 also illustrates an example method of manufacturing a passive metasurface system for placement within an environment represented by a three-dimensional model of the environment.

In some implementations, metallic pattern distributions within the passive metasurface are modeled on an equivalent circuit including metallic patterns of the metallic pattern distributions and a substrate with a predefined thickness supporting the metallic patterns. Tuning the propagation coefficient may include tuning the propagation coefficient to maximize transmittance through the passive metasurface with an approximately $2\pi$ phase shift across a predefined frequency band.

In some implementations, the method includes measuring a received signal strength at each object in the environment and tuning a propagation coefficient for each object in the three-dimensional model to minimize error between the received signal strength measured at each object in the environment and received signal strength simulated at each object for the at least some of the rays.

In alternative implementations, machine learning techniques may be used to design passive metasurfaces and their placements within three-dimensional environments. In one implementation, a 3D model of an environment is used to generate a radiofrequency (RF) heatmap, which essentially equips a viewer with radiofrequency vision. More specifically, such an implementation takes a 3D model of an environment, which can be obtained using a LiDAR sensor available on mobile devices (e.g., iPhones and iPads), along with a small number of RF signal measurements as the input, and uses a neural network based on a diffusion model to generate the RF heatmap. A diffusion approach simplifies complex optimization problems into straightforward probabilistic calculations over multiple steps, thereby reducing the learning difficulty.

In order to apply the diffusion model to generate an RF heatmap corresponding to the 3D environment model, the diffusion model is conditioned by a technique that allows for the generation of samples that satisfy specific criteria. Each step of the diffusion process learns the conditional probability based on the conditioning signal, which ensures that the generated content not only conforms to the RF signal distribution but also satisfies certain conditions. To guarantee that the generated RF signal map accurately reflects the real-world results, a comprehensive array of conditioning RF-3D Features is developed. Features are extracted from the input 3D environment model, and RF-related information is to be used as the condition during the reverse process. This is achieved by adjusting the model parameters to steer the generation process towards samples that satisfy the desired condition.

The RF-3D Features used in conditioning leverage the 3D environment model, pre-measurement, frequencies, and access point (AP) locations. Multiple feature layers are extracted from the 3D environment model. Multi-scale embedding is applied using feature pyramid networks. A transformer (e.g., a Swin Transformer) generates features from pre-measurements and overview images of the 3D environment. Fourier embedding is used for the transmitter (TX) locations and the skeleton of the room, including walls and floors, which are elements in signal propagation, to help with channel estimation. With RF-3D Features, a 2D RF signal map covering the entire room is constructed. Each pixel in the RF signal map represents each RX. Unfortunately, mapping between 3D and 2D is challenging because these different modal datasets have inherent ambiguity. Therefore, the 3D-RX pairing block can efficiently map each RX in 2D RF images and 3D features. This block consists of an upsampling layer and feature fusion to match the shape of 2D RF signal images with 3D features on a one-to-one basis.

Figure 19:
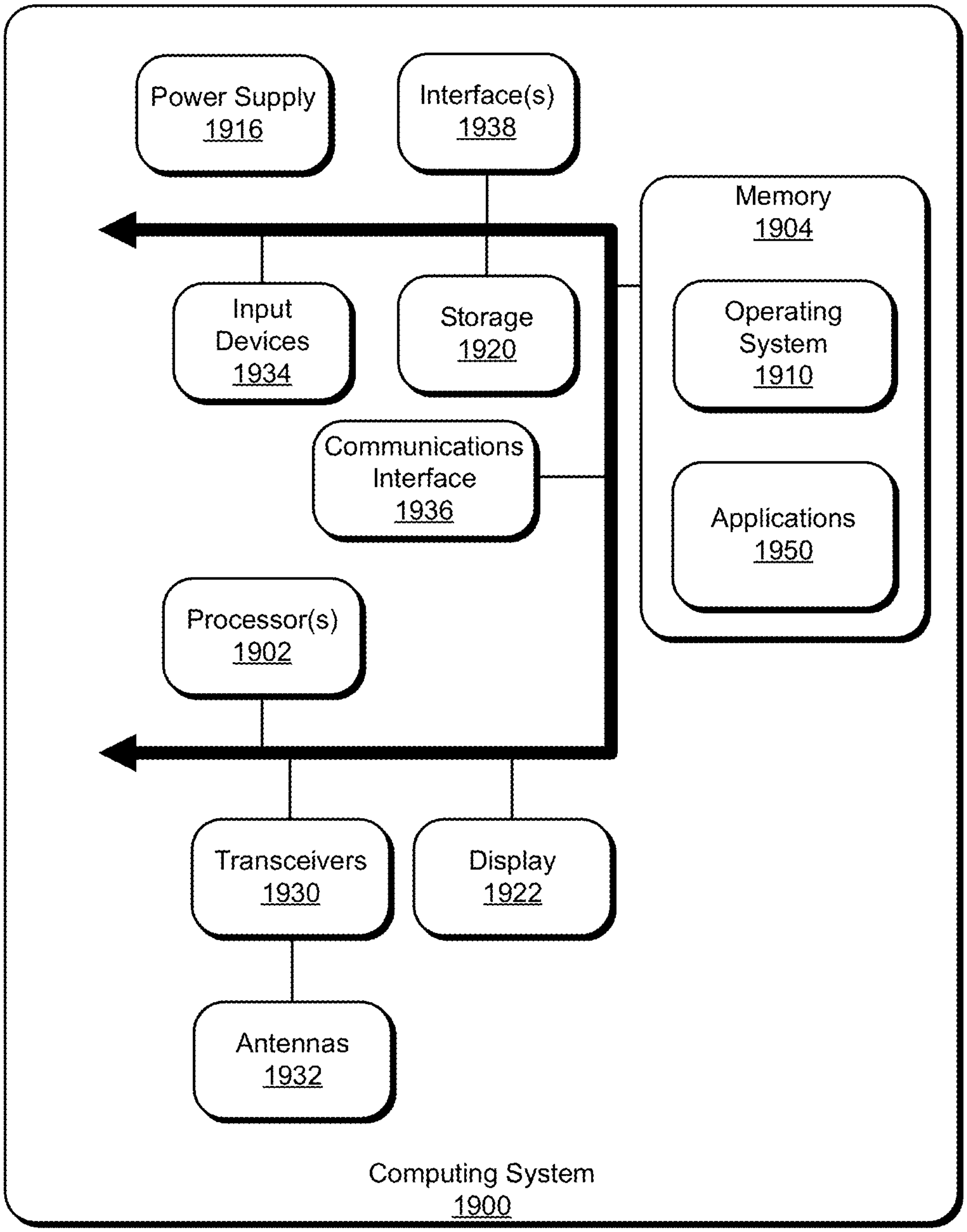
FIG. 19 illustrates an example computing system for use in implementing the described technology.

FIG. 19 illustrates an example computing system 1900 for use in implementing the described technology. The computing system 1900 may include a client computing device (such as a laptop computer, a desktop computer, or a tablet computer), a server/cloud computing device, an Internet-of-Things (IoT), any other type of computing device, or a combination of these options. The computing system 1900 includes one or more hardware processor(s) 1902 and a memory 1904. The memory 1904 generally includes both volatile memory (e.g., RAM) and nonvolatile memory (e.g., flash memory), although one or the other type of memory may be omitted. An operating system 1910 resides in the memory 1904 and is executed by the processor(s) 1902. In some implementations, the computing system 1900 includes and/or is communicatively coupled to storage 1920.

In the example computing system 1900, as shown in FIG. 19, one or more software modules, segments, and/or processors, such as applications 1950, control software, simulation software, raytracing software, and other program code and modules are loaded into the operating system 1910 on the memory 1904 and/or the storage 1920 and executed by the processor(s) 1902. The storage 1920 may store locations, metasurface properties, signal properties, reflective properties, and other data and be local to the computing system 1900 or may be remote and communicatively connected to the computing system 1900. In particular, in one implementation, components of a system for designing/manufacturing passive metasurfaces and placements of such passive metasurfaces within a three-dimensional environment may be implemented entirely in hardware or in a combination of hardware circuitry and software.

The computing system 1900 includes a power supply 1916, which may include or be connected to one or more batteries or other power sources, and which provides power to other components of the computing system 1900. The power supply 1916 may also be connected to an external power source that overrides or recharges the built-in batteries or other power sources.

The computing system 1900 may include one or more communication transceivers 1930, which may be connected to one or more antenna(s) 1932 to provide network connectivity (e.g., mobile phone network, Wi-Fi®, Bluetooth®) to one or more other servers, client devices, IoT devices, and other computing and communications devices. The computing system 1900 may further include a communications interface 1936 (such as a network adapter or an I/O port, which are types of communication devices). The computing system 1900 may use the adapter and any other types of communication devices for establishing connections over a wide-area network (WAN) or local-area network (LAN). It should be appreciated that the network connections shown are exemplary and that other communications devices and means for establishing a communications link between the computing system 1900 and other devices may be used.

The computing system 1900 may include one or more input devices 1934 such that a user may enter commands and information (e.g., a keyboard, trackpad, or mouse). These and other input devices may be coupled to the server by one or more interfaces 1938, such as a serial port interface, parallel port, or universal serial bus (USB). The computing system 1900 may further include a display 1922, such as a touchscreen display.

The computing system 1900 may include a variety of tangible processor-readable storage media and intangible processor-readable communication signals. Tangible processor-readable storage can be embodied by any available media that can be accessed by the computing system 1900 and can include both volatile and nonvolatile storage media and removable and non-removable storage media. Tangible processor-readable storage media excludes intangible and transitory communications signals (such as signals per se) and includes volatile and nonvolatile, removable and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing system 1900. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of designing a passive metasurface system within an environment, the method comprising: receiving a three-dimensional model of the environment including one or more transmitter locations and one or more target locations; and determining one or more metasurface designs and placements to achieve a given objective.

Clause 2. The method of clause 1, further comprises: computing a received signal strength at the one or more target locations based on the three-dimensional model of the environment.

Clause 3. The method of clause 2, further comprises: computing the received signal strength at the one or more target locations based on the three-dimensional model of the environment and the one or more metasurface designs and placements.

Clause 4. The method of clause 3, further comprises: simulating rays that propagate from the one or more transmitter locations to locations within the environment, wherein at least some of the rays are simulated to propagate through one or more passive metasurfaces within the environment and to yield attenuation and phase of each ray propagating through the one or more passive metasurfaces; and computing the received signal strength at the one or more target locations for each ray arriving at each target location within the environment based on the attenuation and the phase of each ray propagating through the one or more passive metasurfaces.

Clause 5. The method of clause 4, further comprising: measuring the received signal strength at one or more locations in the environment, wherein the environment includes one or more objects; and starting from initial propagation coefficients, tuning a propagation coefficient for each object in the three-dimensional model to minimize error between the received signal strength measured at each object in the environment and the received signal strength simulated at each object for at least some of the rays.

Clause 6. The method of clause 5, wherein the propagation coefficient for each object is initialized based on a material type detected on an exterior surface of the object using computer vision.

Clause 7. The method of clause 3 further comprising: using machine learning to determine the received signal strength at the one or more target locations on the three-dimensional model of the environment and the one or more metasurface designs and placements.

Clause 8. The method of clause 1, wherein design configurations of one or more passive metasurfaces include metallic pattern distributions within the one or more passive metasurfaces, and further comprising: tuning positions of the one or more passive metasurfaces placed within the environment, and the design configurations of the one or more passive metasurfaces placed within the environment to achieve a given objective based on placement of an access point within the environment and on a codebook of transmission signal properties of signals transmitted by the access point.

Clause 9. The method of clause 1, wherein design configurations of one or more passive metasurfaces include metallic pattern distributions within the one or more passive metasurfaces, and further comprising: tuning positions and design configurations of one or more passive metasurfaces placed within the environment to achieve a given objective.

Clause 10. The method of clause 9, wherein design configurations of one or more passive metasurfaces include metallic pattern distributions within the one or more passive metasurfaces, and further comprising: tuning positions and design configurations of the one or more passive metasurfaces placed within the environment and codebooks at a transmitter and/or a receiver to achieve a given objective.

Clause 11. The method of clause 9, wherein design configurations of one or more passive metasurfaces include metallic pattern distributions within the one or more passive metasurfaces, and further comprising: tuning positions and design configurations of the one or more passive metasurfaces placed within the environment and codebooks and positions of a transmitter and/or a receiver to achieve a given objective.

Clause 12. The method of clause 9, wherein tuning includes a search based on simulated annealing, Bayesian optimization, reinforcement learning, or a genetic algorithm.

Clause 13. A system for designing a passive metasurface system within an environment, the system comprising: one or more hardware processors; and a design software system including program code storable in memory, executable by the one or more hardware processors, and configured to: receive a three-dimensional model of the environment including one or more transmitter locations and one or more target locations, and determine one or more metasurface designs and placements to achieve a given objective.

Clause 14. The system of clause 13, wherein the design software system is further configured to compute a received signal strength at the one or more target locations based on the three-dimensional model of the environment.

Clause 15. The system of clause 14, wherein the design software system is further configured to compute the received signal strength at the one or more target locations based on the three-dimensional model of the environment and the one or more metasurface designs and placements.

Clause 16. The system of clause 15, wherein the design software system is further configured to: simulate rays that propagate from the one or more transmitter locations to locations within the environment, wherein at least some of the rays are simulated to propagate through one or more passive metasurfaces within the environment and to yield attenuation and phase of each ray propagating through the one or more passive metasurfaces, and compute the received signal strength at the one or more target locations for each ray arriving at each target location within the environment based on the attenuation and the phase of each ray propagating through the one or more passive metasurfaces.

Clause 17. The system of clause 16, wherein the design software system is further configured to: measure the received signal strength at one or more locations in the environment, wherein the environment includes one or more objects, and starting from initial propagation coefficients, tune a propagation coefficient for each object in the three-dimensional model to minimize error between the received signal strength measured at each object in the environment and the received signal strength simulated at each object for at least some of the rays.

Clause 18. The system of clause 17, wherein the propagation coefficient for each object is initialized based on a material type detected on an exterior surface of the object using computer vision.

Clause 19. The system of clause 15, wherein the design software system is further configured to: use machine learning to determine the received signal strength at the one or more target locations on the three-dimensional model of the environment and the one or more metasurface designs and placements.

Clause 20. The system of clause 13, wherein design configurations of one or more passive metasurfaces include metallic pattern distributions within the one or more passive metasurfaces and the design software system is further configured to: tune positions of the one or more passive metasurfaces placed within the environment, and the design configurations of the one or more passive metasurfaces placed within the environment to achieve a given objective based on placement of an access point within the environment and on a codebook of transmission signal properties of signals transmitted by the access point.

Clause 21. The system of clause 13, wherein design configurations of one or more passive metasurfaces include metallic pattern distributions within the one or more passive metasurfaces and the design software system is further configured to: tune positions and design configurations of one or more passive metasurfaces placed within the environment to achieve a given objective.

Clause 22. The system of clause 13, wherein design configurations of one or more passive metasurfaces include metallic pattern distributions within the one or more passive metasurfaces and the design software system is further configured to: tune positions and design configurations of the one or more passive metasurfaces placed within the environment and codebooks at a transmitter and/or a receiver to achieve a given objective.

Clause 23. The system of clause 13, wherein design configurations of one or more passive metasurfaces include metallic pattern distributions within the one or more passive metasurfaces and the design software system is further configured to: tune positions and design configurations of the one or more passive metasurfaces placed within the environment and codebooks and positions of a transmitter and/or a receiver to achieve a given objective.

Clause 24. The system of clause 13, wherein tuning includes a search based on simulated annealing, Bayesian optimization, reinforcement learning, or a genetic algorithm.

Clause 25. One or more tangible processor-readable storage media embodied with instructions for executing on one or more processors and circuits of a computing system a process for designing a passive metasurface system within an environment, the process comprising: receiving a three-dimensional model of the environment including one or more transmitter locations and one or more target locations; and determining one or more metasurface designs and placements to achieve a given objective.

Clause 26. The one or more tangible processor-readable storage media of clause 25, wherein the process further comprises: computing a received signal strength at the one or more target locations based on the three-dimensional model of the environment.

Clause 27. The one or more tangible processor-readable storage media of clause 26, wherein the process further comprises: computing the received signal strength at the one or more target locations based on the three-dimensional model of the environment and the one or more metasurface designs and placements.

Clause 28. The one or more tangible processor-readable storage media of clause 27, wherein the process further comprises: simulating rays that propagate from the one or more transmitter locations to locations within the environment, wherein at least some of the rays are simulated to propagate through one or more passive metasurfaces within the environment and to yield attenuation and phase of each ray propagating through the one or more passive metasurfaces; and computing the received signal strength at the one or more target locations for each ray arriving at each target location within the environment based on the attenuation and the phase of each ray propagating through the one or more passive metasurfaces.

Clause 29. The one or more tangible processor-readable storage media of clause 28, wherein the process further comprises: measuring the received signal strength at one or more locations in the environment, wherein the environment includes one or more objects; and starting from initial propagation coefficients, tuning a propagation coefficient for each object in the three-dimensional model to minimize error between the received signal strength measured at each object in the environment and the received signal strength simulated at each object for at least some of the rays.

Clause 30. The one or more tangible processor-readable storage media of clause 29, wherein the propagation coefficient for each object is initialized based on a material type detected on an exterior surface of the object using computer vision.

Clause 31. The one or more tangible processor-readable storage media of clause 27, wherein the process further comprises: using machine learning to determine the received signal strength at the one or more target locations on the three-dimensional model of the environment and the one or more metasurface designs and placements.

Clause 32. The one or more tangible processor-readable storage media of clause 25, wherein design configurations of one or more passive metasurfaces include metallic pattern distributions within the one or more passive metasurfaces, and the process further comprises: tuning positions of the one or more passive metasurfaces placed within the environment, and the design configurations of the one or more passive metasurfaces placed within the environment to achieve a given objective based on placement of an access point within the environment and on a codebook of transmission signal properties of signals transmitted by the access point.

Clause 33. The one or more tangible processor-readable storage media of clause 25, wherein design configurations of one or more passive metasurfaces include metallic pattern distributions within the one or more passive metasurfaces, and the process further comprises: tuning positions and design configurations of one or more passive metasurfaces placed within the environment to achieve a given objective.

Clause 34. The one or more tangible processor-readable storage media of clause 25, wherein design configurations of one or more passive metasurfaces include metallic pattern distributions within the one or more passive metasurfaces, and the process further comprises: tuning positions and design configurations of the one or more passive metasurfaces placed within the environment and codebooks at a transmitter and/or a receiver to achieve a given objective.

Clause 35. The one or more tangible processor-readable storage media of clause 25, wherein design configurations of one or more passive metasurfaces include metallic pattern distributions within the one or more passive metasurfaces, and the process further comprises: tuning positions and design configurations of the one or more passive metasurfaces placed within the environment and codebooks and positions of a transmitter and/or a receiver to achieve a given objective.

Clause 36. The one or more tangible processor-readable storage media of clause 25, wherein tuning includes a search based on simulated annealing, Bayesian optimization, reinforcement learning, or a genetic algorithm.

Clause 37. A system of manufacturing a passive metasurface, the system comprising: one or more hardware processors; and a manufacturing software system including program code storable in memory, executable by the one or more hardware processors, and configured to: control a hot-stamping machine to hot-stamping metallic patterns onto one or more substrates with certain separations according to a given metallic pattern distribution.

Clause 38. The system of clause 37, wherein the manufacturing software system is further configured to: determine a unit cell structure of a metasurface that achieves a high reflection ratio, close to $2\pi$ phase offset across a given bandwidth.

Clause 39. The system of clause 37, wherein the manufacturing software system is further configured to: determine a unit cell structure of a metasurface that achieves a high transmittance ratio, close to $2\pi$ phase offset across a given bandwidth.

Clause 40. The system of clause 37, wherein the manufacturing software system is further configured to: determine a metasurface metallic pattern according to a computed design configuration across all unit cells.

Clause 41. A method of manufacturing a passive metasurface, the method comprising: hot-stamping metallic patterns onto one or more substrates with certain separations according to a given metallic pattern distribution.

Clause 42. The method of clause 41, further comprising: determining a unit cell structure of a metasurface that achieves a high reflection ratio, close to $2\pi$ phase offset across a given bandwidth.

Clause 43. The method of clause 41, further comprising: determining a unit cell structure of a metasurface that achieves a high transmittance ratio, close to $2\pi$ phase offset across a given bandwidth.

Clause 44. The method of clause 41, further comprising: determining a metasurface metallic pattern according to a computed design configuration across all unit cells.

Clause 45. One or more tangible processor-readable storage media embodied with instructions for executing on one or more hardware processors and circuits of a computing system a process for manufacturing a passive metasurface, the process comprising: controlling a hot-stamping machine to hot-stamp metallic patterns onto one or more substrates with certain separations according to a given metallic pattern distribution.

Clause 46. The one or more tangible processor-readable storage media of clause 45, wherein the process further comprises: determining a unit cell structure of a metasurface that achieves a high reflection ratio, close to $2\pi$ phase offset across a given bandwidth.

Clause 47. The one or more tangible processor-readable storage media of clause 45, wherein the process further comprises: determining a unit cell structure of a metasurface that achieves a high transmittance ratio, close to $2\pi$ phase offset across a given bandwidth.

Clause 48. The one or more tangible processor-readable storage media of clause 45, wherein the process further comprises: determining a metasurface metallic pattern according to a computed design configuration across all unit cells.

Clause 49. A method of designing a passive metasurface system within an environment, the method comprising: receiving a three-dimensional model of the environment including a location of an access point and a location of a target point; calculating rays that propagate from the access point to locations within the environment, wherein at least some of the rays are simulated to propagate through one or more passive metasurfaces within the environment and to yield attenuation and phase of each ray propagating through the one or more passive metasurfaces; computing a received signal strength at the location of the target point for each ray arriving at the target point within the environment based on the attenuation and phase of each ray propagating through the one or more passive metasurfaces; and determining design configurations of the one or more passive metasurfaces within the environment based on the received signal strength computed at the location of the target point for each ray.

Clause 50. The method of clause 49, wherein the three-dimensional model of the environment further includes one or more objects the one or more passive metasurfaces within the environment, and further comprising: measuring a received signal strength at each passive metasurface of the one or more metasurfaces within the environment; computing a received signal strength at each object of the one or more objects included in the three-dimensional model; and tuning a propagation coefficient for each passive metasurface of the one or more passive metasurfaces to minimize error between the received signal strength measured at each passive metasurface and the received signal strength computed at each object of the one or more objects.

Clause 51. The method of clause 50, wherein the design configurations of the one or more passive metasurfaces include metallic pattern distributions within the one or more passive metasurfaces, and tuning of the propagation coefficient for the one or more passive metasurfaces comprises: tuning a number of the one or more passive metasurfaces placed within the environment, positions of the one or more passive metasurfaces placed within the environment, and the design configurations of the one or more passive metasurfaces placed within the environment to maximize the received signal strength at the target point in the environment.

Clause 52. The method of clause 50, further comprising: tuning the access point with respect to the one or more passive metasurfaces to maximize the received signal strength at the target point in the environment based on a codebook of transmission signal properties of signals transmitted by the access point.

Clause 53. The method of clause 50, further comprising: tuning the access point with respect to the one or more passive metasurfaces to maximize the received signal strength at the target point in the environment based on placement of the access point within the environment.

Clause 54. The method of clause 50, wherein tuning includes a search based on simulated annealing, Bayesian optimization, a gradient descent algorithm, or a genetic algorithm.

Clause 55. The method of clause 50, wherein tuning includes maximizing signal-to-noise ratio of signals received at the target point or a capacity of a communication link between the access point and the target point.

Clause 56. The method of clause 50, wherein metallic pattern distributions within the one or more passive metasurfaces are modeled on an equivalent circuit for each passive metasurface including metallic patterns of the metallic pattern distributions and a substrate with a predefined thickness supporting the metallic patterns.

Clause 57. The method of clause 50, wherein tuning the propagation coefficient comprises: tuning the propagation coefficient to maximize transmittance through the passive metasurface with an approximately $2\pi$ phase shift across a predefined frequency band.

Clause 58. The method of clause 50, further comprising: tuning a propagation coefficient for the at least one passive metasurface positioned in the three-dimensional model to minimize error between the received signal strength measured at each object in the environment and received signal strength simulated at each object for at least some of the rays.

Clause 59. A method of manufacturing one or more passive metasurfaces for placement within an environment represented by a three-dimensional model of the environment, the three-dimensional model including a location of an access point and a location of a target point and further includes one or more objects, the one or more objects including at least one passive metasurface, the method comprising: receiving a design generated by calculating ray traces that propagate from the access point to locations within the environment, wherein at least some of the rays are simulated to propagate via the one or more objects within the environment and to yield attenuation and phase of each ray propagating through the one or more passive metasurfaces, computing a received signal strength at the location of the target point for each ray arriving at the target point within the environment based on the attenuation and phase of each ray propagating through the one or more passive metasurfaces, measuring a received signal strength at each object in the environment, tuning a propagation coefficient for each object in the three-dimensional model to minimize error between the received signal strength measured at each object in the environment and the received signal strength computed at each object for at least some of the rays, wherein the propagation coefficient of a passive metasurface is based at least in part on metallic pattern distributions within the passive metasurface, and determining design configurations of a passive metasurface within the environment based on the received signal strength calculated at the location of the target point for each ray; and hot-stamping metallic patterns onto a substrate according to the metallic pattern distributions tuned for the propagation coefficient to form the passive metasurface.

Clause 60. One or more tangible processor-readable storage media embodied with instructions for executing on one or more processors and circuits of a computing system a process for designing a passive metasurface system within an environment, the process comprising: receiving a three-dimensional model of the environment including a location of an access point and a location of a target point; calculating rays that propagate from the access point to locations within the environment, wherein at least some of the rays are simulated to propagate through one or more passive metasurfaces within the environment and to yield attenuation and phase of each ray propagating through the one or more passive metasurfaces; computing a received signal strength at the location of the target point for each ray arriving at the target point within the environment based on the attenuation and phase of each ray propagating through the one or more passive metasurfaces; and determining design configurations of a passive metasurface within the environment based on the received signal strength calculated at the location of the target point for each ray.

Clause 61. The one or more tangible processor-readable storage media of clause 60, wherein the three-dimensional model of the environment further includes one or more objects, the one or more objects including at least one passive metasurface of the one or more passive metasurfaces, and further comprising: measuring a received signal strength at at least one passive metasurface positioned in the environment; and tuning a propagation coefficient for the at least one passive metasurface positioned in the three-dimensional model to minimize error between the received signal strength measured at each object in the environment and the received signal strength simulated at each object for at least some of the rays.

Clause 62. The one or more tangible processor-readable storage media of clause 61, wherein design configurations of the one or more passive metasurfaces include metallic pattern distributions within the one or more passive metasurfaces, and tuning of the propagation coefficient of the one or more passive metasurfaces comprises: tuning a number of the one or more passive metasurfaces placed within the environment, positions of the one or more passive metasurfaces placed within the environment, and the design configurations of the one or more passive metasurfaces placed within the environment to maximize the received signal strength at the target point in the environment.

Clause 63. The one or more tangible processor-readable storage media of clause 61, further comprising: tuning the access point with respect to the one or more passive metasurfaces to maximize the received signal strength at the target point in the environment based on a codebook of transmission signal properties of signals transmitted by the access point.

Clause 64. The one or more tangible processor-readable storage media of clause 61, further comprising: tuning the access point with respect to the one or more passive metasurfaces to maximize the received signal strength at the target point in the environment based on placement of the access point within the environment.

Clause 65. The one or more tangible processor-readable storage media of clause 61, wherein tuning includes a search based on simulated annealing, Bayesian optimization, a gradient descent algorithm, or a genetic algorithm.

Clause 66. The one or more tangible processor-readable storage media of clause 61, wherein tuning includes maximizing signal-to-noise ratio of signals received at the target point or a capacity of a communication link between the access point and the target point.

Clause 67. A system of designing a passive metasurface system within an environment, the system comprising: means for receiving a three-dimensional model of the environment including one or more transmitter locations and one or more target locations; and means for determining one or more metasurface designs and placements to achieve a given objective.

Clause 68. The system of clause 67, further comprises: means for computing a received signal strength at the one or more target locations based on the three-dimensional model of the environment.

Clause 69. The system of clause 68, further comprises: means for computing the received signal strength at the one or more target locations based on the three-dimensional model of the environment and the one or more metasurface designs and placements.

Clause 70. The system of clause 69, further comprises: means for simulating rays that propagate from the one or more transmitter locations to locations within the environment, wherein at least some of the rays are simulated to propagate through one or more passive metasurfaces within the environment and to yield attenuation and phase of each ray propagating through the one or more passive metasurfaces; and means for computing the received signal strength at the one or more target locations for each ray arriving at each target location within the environment based on the attenuation and the phase of each ray propagating through the one or more passive metasurfaces.

Clause 71. The system of clause 70, further comprising: means for measuring the received signal strength at one or more locations in the environment, wherein the environment includes one or more objects; and starting from initial propagation coefficients, tuning a propagation coefficient for each object in the three-dimensional model to minimize error between the received signal strength measured at each object in the environment and the received signal strength simulated at each object for at least some of the rays.

Clause 72. The system of clause 71, wherein the propagation coefficient for each object is initialized based on a material type detected on an exterior surface of the object using computer vision.

Clause 73. The system of clause 70 further comprising: means for using machine learning to determine the received signal strength at the one or more target locations on the three-dimensional model of the environment and the one or more metasurface designs and placements.

Clause 74. The system of clause 68, wherein design configurations of one or more passive metasurfaces include metallic pattern distributions within the one or more passive metasurfaces, and further comprising: means for tuning positions of the one or more passive metasurfaces placed within the environment, and the design configurations of the one or more passive metasurfaces placed within the environment to achieve a given objective based on placement of an access point within the environment and on a codebook of transmission signal properties of signals transmitted by the access point.

Clause 75. The system of clause 68, wherein design configurations of one or more passive metasurfaces include metallic pattern distributions within the one or more passive metasurfaces, and further comprising: means for tuning positions and design configurations of one or more passive metasurfaces placed within the environment to achieve a given objective.

Clause 76. The system of clause 70, wherein design configurations of one or more passive metasurfaces include metallic pattern distributions within the one or more passive metasurfaces, and further comprising: means for tuning positions and design configurations of the one or more passive metasurfaces placed within the environment and codebooks at a transmitter and/or a receiver to achieve a given objective.

Clause 77. The system of clause 70, wherein design configurations of one or more passive metasurfaces include metallic pattern distributions within the one or more passive metasurfaces, and further comprising: means for tuning positions and design configurations of the one or more passive metasurfaces placed within the environment and codebooks and positions of a transmitter and/or a receiver to achieve a given objective.

Clause 78. The method of clause 9, wherein the means for tuning includes a search based on simulated annealing, Bayesian optimization, reinforcement learning, or a genetic algorithm.

Clause 79. A system of manufacturing a passive metasurface, the system comprising: means for hot-stamping metallic patterns onto one or more substrates with certain separations according to a given metallic pattern distribution.

Clause 80. The system of clause 79, further comprising: means for determining a unit cell structure of a metasurface that achieves a high reflection ratio, close to $2\pi$ phase offset across a given bandwidth.

Clause 80. The system of clause 79, further comprising: means for determining a unit cell structure of a metasurface that achieves a high transmittance ratio, close to $2\pi$ phase offset across a given bandwidth.

Clause 81. The system of clause 79, further comprising: means for determining a metasurface metallic pattern according to a computed design configuration across all unit cells.

Clause 82. A system for designing a passive metasurface system within an environment, the system comprising: means for receiving a three-dimensional model of the environment including a location of an access point and a location of a target point; means for calculating rays that propagate from the access point to locations within the environment, wherein at least some of the rays are simulated to propagate through one or more passive metasurfaces within the environment and to yield attenuation and phase of each ray propagating through the one or more passive metasurfaces; means for computing a received signal strength at the location of the target point for each ray arriving at the target point within the environment based on the attenuation and phase of each ray propagating through the one or more passive metasurfaces; and means for determining design configurations of a passive metasurface within the environment based on the received signal strength calculated at the location of the target point for each ray.

Clause 83. The system of clause 82, wherein the three-dimensional model of the environment further includes one or more objects including at least one passive metasurface of the one or more passive metasurfaces, and further comprising: means for measuring a received signal strength at at least one passive metasurface positioned in the environment; and means for tuning a propagation coefficient for the at least one passive metasurface positioned in the three-dimensional model to minimize error between the received signal strength measured at each object in the environment and the received signal strength computed at each object for at least some of the rays.

Clause 84. The system of clause 82, wherein design configurations of the one or more passive metasurfaces include metallic pattern distributions within the one or more passive metasurfaces, and the means for tuning the propagation coefficient for the one or more passive metasurfaces in the three-dimensional model comprises: means for tuning a number of the one or more passive metasurfaces placed within the environment, positions of the one or more passive metasurfaces placed within the environment, and the design configurations of the one or more passive metasurfaces placed within the environment to maximize the received signal strength at the target point in the environment.

Clause 95. The system of clause 82, further comprising: means for tuning the access point with respect to the one or more passive metasurfaces to maximize the received signal strength at the target point in the environment based on a codebook of transmission signal properties of signals transmitted by the access point.

Clause 96. The system of clause 82, further comprising: means for tuning the access point with respect to the one or more passive metasurfaces to maximize the received signal strength at the target point in the environment based on placement of the access point within the environment.

Clause 97. The system of clause 82, wherein the means for tuning includes a search based on simulated annealing, Bayesian optimization, a gradient descent algorithm, or a genetic algorithm.

Clause 98. The system of clause 82 wherein means for tuning includes means for maximizing signal-to-noise ratio of signals received at the target point or a capacity of a communication link between the access point and the target point.

Clause 99. The system of clause 82, wherein metallic pattern distributions within the passive metasurface are modeled on an equivalent circuit including metallic patterns of the metallic pattern distributions and a substrate with a predefined thickness supporting the metallic patterns.

Clause 100. The system of clause 82, wherein means for tuning the propagation coefficient comprises: means for tuning the propagation coefficient to maximize transmittance through the passive metasurface with an approximately $2\pi$ phase shift across a predefined frequency band.

Clause 101. The system of clause 82, further comprising: means for tuning a propagation coefficient for the at least one passive metasurface positioned in the three-dimensional model to minimize error between the received signal strength measured at each object in the environment and received signal strength simulated at each object for at least some of the rays.

Clause 102. A system for manufacturing one or more passive metasurfaces for placement within an environment represented by a three-dimensional model of the environment, the three-dimensional model including a location of an access point and a location of a target point and further includes one or more objects, the one or more objects including at least one passive metasurface, the system comprising: means for receiving a design generated by calculating ray traces that propagate from the access point to locations within the environment, wherein at least some of the rays are simulated to propagate via the one or more objects within the environment and to yield attenuation and phase of each ray propagating through the one or more passive metasurfaces, computing a received signal strength at the location of the target point for each ray arriving at the target point within the environment based on the attenuation and phase of each ray propagating through the one or more passive metasurfaces, measuring a received signal strength at each object in the environment, tuning a propagation coefficient for each object in the three-dimensional model to minimize error between the received signal strength measured at each object in the environment and the received signal strength computed at each object for at least some of the rays, wherein the propagation coefficient of a passive metasurface is based at least in part on metallic pattern distributions within the passive metasurface, and determining design configurations of a passive metasurface within the environment based on the received signal strength calculated at the location of the target point for each ray; and means for hot-stamping metallic patterns onto a substrate according to the metallic pattern distributions tuned for the propagation coefficient to form the passive metasurface.

It should be understood that various systems for performing the methods described herein are also disclosed within the described technology, wherein various means have been described for executing the operations recited in the methods as part of such systems.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method, implemented by a computing device, of designing a passive metasurface system for deployment within an environment, the method comprising:

receiving, by the computing device, a three-dimensional model of the environment including one or more transmitter locations and one or more target locations; and determining, using the three-dimensional model, at least one structural design of one or more passive metasurfaces of the passive metasurface system and at least one placement of the one or more passive metasurfaces within the environment to achieve a given objective during the deployment, wherein the objective is to optimize the designs of low-cost passive metasurfaces.

2. The method of claim 1, further comprises:

computing a received signal strength at the one or more target locations based on the three-dimensional model of the environment.

3. The method of claim 2, further comprises:

computing the received signal strength at the one or more target locations based on the three-dimensional model of the environment and the at least one structural design and the at least one placement.

4. The method of claim 3, further comprises:

simulating rays that propagate from the one or more transmitter locations to locations within the environment, wherein at least some of the rays are simulated to propagate through the one or more passive metasurfaces within the environment and to yield attenuation and phase of each ray propagating through the one or more passive metasurfaces; and computing the received signal strength at the one or more target locations for each ray arriving at each target location within the environment based on the attenuation and the phase of each ray propagating through the one or more passive metasurfaces.

5. The method of claim 4, further comprising:

measuring the received signal strength at one or more locations in the environment, wherein the environment includes one or more objects; and starting from initial propagation coefficients, tuning a propagation coefficient for each object in the three-dimensional model to minimize error between the received signal strength measured at each object in the environment and the received signal strength simulated at each object for at least some of the rays.

6. The method of claim 5, wherein the propagation coefficient for each object is initialized based on a material type detected on an exterior surface of the object using computer vision.

7. The method of claim 3 further comprising:

using machine learning to determine the received signal strength at the one or more target locations on the three-dimensional model of the environment and the at least one structural design and the at least one placement.

8. The method of claim 1, wherein structural design configurations of the one or more passive metasurfaces include metallic pattern distributions within the one or more passive metasurfaces, and further comprising:

tuning positions of the one or more passive metasurfaces placed within the environment, and the structural design configurations of the one or more passive metasurfaces placed within the environment to achieve the given objective based on placement of an access point within the environment and on a codebook of transmission signal properties of signals transmitted by the access point.

9. The method of claim 1, wherein structural design configurations of the one or more passive metasurfaces include metallic pattern distributions within the one or more passive metasurfaces, and further comprising:

tuning positions and the structural design configurations of the one or more passive metasurfaces to achieve the given objective.

10. The method of claim 9, wherein the structural design configurations of the one or more passive metasurfaces include metallic pattern distributions within the one or more passive metasurfaces, and further comprising:

tuning positions and the structural design configurations of the one or more passive metasurfaces placed within the environment and codebooks at a transmitter and/or a receiver to achieve the given objective.

11. The method of claim 9, wherein the structural design configurations of the one or more passive metasurfaces include metallic pattern distributions within the one or more passive metasurfaces, and further comprising:

tuning positions and the structural design configurations of the one or more passive metasurfaces placed within the environment and codebooks and positions of a transmitter and/or a receiver to achieve the given objective.

12. The method of claim 9, wherein tuning includes a search based on simulated annealing, Bayesian optimization, reinforcement learning, or a genetic algorithm.

13. The method of claim 1, further comprising:

tuning, based on placement of an access point within the environment and on a codebook of transmission signal properties of signals transmitted by the access point, structural design configurations of the passive metasurface system within the environment to identify a particular design configuration to achieve the given objective.

14. The method of claim 1, wherein determining the at least one structural design includes selecting metallic pattern distributions of unit cells of the one or more passive metasurfaces.

15. A method, implemented by a computing device, of designing a passive metasurface system for deployment within an environment, the method comprising:

receiving, by the computing device, a three-dimensional model of the environment including a location of an access point and a location of a target point;

calculating, using the three-dimensional model, rays that propagate from the access point to locations within the environment, wherein at least some of the rays are simulated to propagate through one or more passive metasurfaces within the environment and to yield attenuation and phase of each ray propagating through the one or more passive metasurfaces;

computing, using the three-dimensional model, a received signal strength at the location of the target point for each ray arriving at the target point based on the attenuation and phase of each ray propagating through the one or more passive metasurfaces; and determining structural design configurations of the one or more passive metasurfaces within the environment based on the received signal strength computed at the location of the target point for each ray.

16. The method of claim 15, wherein the three-dimensional model of the environment further includes one or more objects including the one or more passive metasurfaces within the environment, and further comprising:

measuring a received signal strength at each passive metasurface of the one or more passive metasurfaces within the environment;

computing a received signal strength at each object of the one or more objects included in the three-dimensional model; and tuning a propagation coefficient for each passive metasurface of the one or more passive metasurfaces to minimize error between the received signal strength measured at each passive metasurface and the received signal strength computed at each object of the one or more objects.

17. The method of claim 16, wherein the structural design configurations of the one or more passive metasurfaces include includes metallic pattern distributions within the one or more passive metasurfaces, and tuning of the propagation coefficient for the one or more passive metasurfaces comprises:

tuning a number of the one or more passive metasurfaces placed within the environment, positions of the one or more passive metasurfaces placed within the environment, and the structural design configurations of the one or more passive metasurfaces placed within the environment to maximize the received signal strength at the target point in the environment.

18. The method of claim 16, further comprising:

tuning the access point with respect to the one or more passive metasurfaces to maximize the received signal strength at the target point in the environment based on a codebook of transmission signal properties of signals transmitted by the access point.

19. The method of claim 16, further comprising:

tuning the access point with respect to the one or more passive metasurfaces to maximize the received signal strength at the target point in the environment based on placement of the access point within the environment.

20. The method of claim 16, wherein tuning includes a search based on simulated annealing, Bayesian optimization, a gradient descent algorithm, or a genetic algorithm.

21. The method of claim 16, wherein tuning includes maximizing signal-to-noise ratio of signals received at the target point or a capacity of a communication link between the access point and the target point.

22. The method of claim 16, wherein metallic pattern distributions within the one or more passive metasurfaces are modeled on an equivalent circuit for each passive metasurface including metallic patterns of the metallic pattern distributions and a substrate with a predefined thickness supporting the metallic patterns.

* * * * *